US012791472B2

(12) United States Patent
Gomez Diaz et al.

(10) Patent No.: US 12,791,472 B2
(45) Date of Patent: Nov. 10, 2026

(54) NEURAL NETWORK ENABLED DISEASE SPECTROSCOPY

(71) Applicant: The Regents of the University of California, Oakland, CA (US)

(72) Inventors: J. Sebastian Gomez Diaz, Davis, CA (US); Randy P. Carney, Davis, CA (US)

(73) Assignee: The Regents of the University of California, Oakland, CA (US)

( * ) Notice: Subject to any disclaimer, the term of this patent is extended or adjusted under 35 U.S.C. 154(b) by 81 days.

(21) Appl. No.: 18/866,221

(22) PCT Filed: May 11, 2023

(86) PCT No.: PCT/US2023/021859
§ 371 (c)(1),
(2) Date: Nov. 15, 2024

(87) PCT Pub. No.: WO2023/224859
PCT Pub. Date: Nov. 23, 2023

(65) Prior Publication Data

US 2025/0321185 A1 Oct. 16, 2025

Related U.S. Application Data

(60) Provisional application No. 63/342,570, filed on May 16, 2022.

(51) Int. Cl.
*G01N 21/3577* (2014.01)
*G01N 21/27* (2006.01)
*G01N 21/552* (2014.01)

(52) U.S. Cl.
CPC ....... *G01N 21/3577* (2013.01); *G01N 21/274* (2013.01); *G01N 21/554* (2013.01);
(Continued)

(58) Field of Classification Search
CPC ............ G01N 21/3577; G01N 21/274; G01N 21/554; G01N 2201/1296
See application file for complete search history.

(56) References Cited

U.S. PATENT DOCUMENTS 6,274,871 B1 * 8/2001 Dukor ................ G02B 21/0004 250/339.08
2021/0239605 A1 * 8/2021 Altug Yanik ...... G01N 21/4133
(Continued)

FOREIGN PATENT DOCUMENTS

| | | | |
|---|---|---|---|
| CN | 113390814 | A | 9/2021 |
| WO | 2019/206430 | A1 | 10/2019 |
| WO | 2021/037872 | A1 | 3/2021 |

OTHER PUBLICATIONS

International Search Report and Written Opinion in PCT/US2023/021859 mailed Jul. 11, 2023; 13 pages.
(Continued)

*Primary Examiner* — Chih-Cheng Kao
(74) *Attorney, Agent, or Firm* — Kilpatrick Townsend & Stockton LLP

(57) ABSTRACT

Described herein are devices, systems, and methods for detecting diseases using neural network enabled disease spectroscopy. Using an infrared (IR) light source, a biofluid sample is irradiated. IR responses within discrete spectral bands are detected using electromechanical IR sensors with piezoelectric resonators having nanopatterned metasurfaces tuned to each discrete spectral band. A discrete set of values corresponding to the IR responses is generated upon which a trained neural network is executed to generate a disease stage classification for the biofluid sample.

14 Claims, 9 Drawing Sheets

(52) U.S. Cl.
CPC ................ *G01N 2201/0221* (2013.01); *G01N 2201/1296* (2013.01)

(56) References Cited

U.S. PATENT DOCUMENTS

| | | | | |
|---|---|---|---|---|
| 2022/0011219 | A1* | 1/2022 | Bertsimas | G06F 18/2193 |
| 2022/0136971 | A1* | 5/2022 | Bauer | G06N 3/0475<br>356/301 |
| 2023/0143594 | A1* | 5/2023 | Yu | A61B 5/282<br>600/523 |

OTHER PUBLICATIONS

Hui, Y. et al.; "Plasmonic piezoelectric nanomechanical resonator for spectrally selective infrared sensing"; Nature Communications; vol. 7, No. 11249; Apr. 15, 2016; 9 pages.

Rutherford, S.H. et al.; "Biofluid analysis and classification using IR and 2D-IR spectroscopy"; Chemometrics and Intelligent Laboratory Systems; Elsevier Science Publishers B.V., Amsterdam NL; vol. 217; Aug. 28, 2021; 11 pages.

Di Meo, V. et al.; "Metasurface based on cross-shaped plasmonic nanoantennas as chemical sensor for surface-enhanced infrared absorption spectroscopy"; Sensors and Actuators B: Chemical; vol. 286, May 1, 2019; pp. 600-607.

* cited by examiner

NEURAL NETWORK ENABLED DISEASE SPECTROSCOPY

CROSS-REFERENCE TO RELATED APPLICATIONS

This application claims the benefit of the filing date of U.S. Provisional Application No. 63/342,570, filed on May 16, 2022, the contents of which are incorporated herein by reference in its entirety for all purposes.

BACKGROUND

Biofluid based analysis represents an emerging non-invasive approach to monitor individual health for a wide range of diseases and conditions. The detection and study of metabolites in biofluids may enable monitoring general health, infectious diseases, immune responses, and many pathologies, such as cancer. Some metabolites may exhibit distinctive absorptive spectral fingerprints in the infrared (IR) portion of the electromagnetic (EM) spectrum. IR spectroscopy of biofluids may deliver highly sensitive and specific diagnostic performance in vivo and ex vivo for monitoring health.

BRIEF SUMMARY

Embodiments of the present disclosure provide an innovative, label-free, and portable Neural Network Enabled Disease Spectroscopy (NNEDS) platform based on plasmonic nano-micro electromechanical systems (NMEMS). Using advanced machine learning (ML) techniques unique spectral fingerprints in various biofluid combinations that are statistically significant to the detection of diseases may be identified. Arrays of NMEMS sensors can be fabricated on a compact chip to detect the unique spectral fingerprints in biofluid test samples. Neural network (NN) architectures may be developed and trained to generate disease classifications using the spectral fingerprints.

An aspect of the present disclosure provides for a device for detecting diseases. The device may comprise an infrared (IR) light source. The device may further comprise a chip comprising a plurality of electromechanical IR sensors. Each electromechanical IR sensor of the electromechanical IR sensors may comprises a piezoelectric resonator having a nanopatterned metasurface configured to absorb IR light within a discrete spectral band centered at a predefined wavelength and having a predefined bandwidth. The device may further comprise at least one processor and a memory storing one or more instructions, which when executed by the at least one processor, configure the device to irradiate a biofluid test sample using the IR light source. The device may further be configured to detect, using the chip, an IR response within the discrete spectral band of each electromechanical IR sensor, thereby providing a plurality of IR responses for the biofluid test sample within a plurality of discrete spectral bands defined by the plurality of electromechanical IR sensors. The device may further be configured to generate a discrete set of values corresponding to the plurality of IR responses. The device may further be configured to generate a disease stage classification for the biofluid test sample by executing a trained neural network on a subset of the discrete set of values.

The device may further comprise a biofluid sample holder disposed adjacent to the IR light source and the chip. The biofluid sample holder may be configured to reflect light from the IR light source through the biofluid test sample onto the plurality of electromechanical IR sensors. In some embodiments, the nanopatterned metasurface of each electromechanical IR sensor comprises a plurality of cross-shaped unit-cells. A separation between each cross-shaped unit-cell may be defined by a periodicity dimension. Arms of each cross-shaped unit-cell may be defined by a length dimension. In some embodiments, the periodicity dimension, the length dimension, or both, configure the nanopatterned metasurface to absorb IR light within the discrete spectral band, and the periodicity dimension, the length dimension, or both, are different between each electromechanical IR sensor.

In some embodiments, the discrete set of values represent relative absorption levels of IR light from the IR light source by the biofluid test sample across the plurality of discrete spectral bands. In some embodiments, the one or more instructions further configure the device to select the trained neural network from a plurality of trained neural networks based on a biofluid type of the biofluid test sample. The biofluid type may be selected from the group consisting of blood, plasma, sweat, saliva, tears, cerebrospinal fluid, ascites, and pleural effusion.

In some embodiments, the biofluid test sample is a first biofluid type of a plurality of biofluid types comprising blood, plasma, sweat, saliva, tears, cerebrospinal fluid, ascites, and pleural effusion, and the one or more instructions further configure the device to select the trained neural network from a plurality of trained neural networks based on a combination of the first biofluid type and at least one additional biofluid type of the plurality of biofluid types. The device may further be configured to irradiate, for the at least one additional biofluid type, a respective biofluid test sample from a same subject as the biofluid test sample using the IR light source. The device may further be configured to detect, using the chip, a second IR response within the discrete spectral band of each electromechanical IR sensor, thereby providing a second plurality of IR responses within the plurality of discrete spectral bands for the respective biofluid test sample. The device may further be configured to generate a second discrete set of values corresponding to the second plurality of IR responses. The device may further be configured to update the disease stage classification by executing the trained neural network on a second subset of the second discrete set of values.

In some embodiments, the one or more instructions further configure the device to select the trained neural network from a plurality of trained neural network based on a disease type. In some embodiments, the discrete spectral band of each electromechanical IR sensor is selected by ranking a plurality of contiguous spectral bands according to a relative importance of a plurality of features corresponding to each contiguous spectral band in generating disease stage classifications by a neural network trained on the plurality of features.

Another aspect of the present disclosure provides for a method of detecting diseases. The method may comprise irradiating a biofluid test sample using an IR light source. The method may further comprise detecting, using a chip, an IR response within each discrete spectral band of a plurality of discrete spectral bands, thereby providing a plurality of IR responses for the biofluid test sample within the plurality of discrete spectral bands. The chip may comprise a plurality of electromechanical IR sensors. Each electromechanical IR sensor of the electromechanical IR sensors may comprise a piezoelectric resonator having a nanopatterned metasurface configured to absorb IR light within a discrete spectral band of the plurality of discrete spectral bands centered at a predefined wavelength and having a predefined bandwidth. The method may further comprise generating a discrete set of values corresponding to the plurality of IR responses. The method may further comprise generating a disease stage classification for the biofluid test sample by executing a trained neural network on a subset of the discrete set of values.

Another aspect of the present disclosure provides for one or more non-transitory computer-readable storage media storing instructions that, upon execution on a computer system, cause the computer system to perform operations comprising irradiating a biofluid test sample using an IR light source. The operations may further comprise detecting, using a chip, an IR response within each discrete spectral band of a plurality of discrete spectral bands, thereby providing a plurality of IR responses for the biofluid test sample within the plurality of discrete spectral bands. The chip may comprise a plurality of electromechanical IR sensors. Each electromechanical IR sensor of the electromechanical IR sensors may comprise a piezoelectric resonator having a nanopatterned metasurface configured to absorb IR light within a discrete spectral band of the plurality of discrete spectral bands centered at a predefined wavelength and having a predefined bandwidth. The operations may further comprise generating a discrete set of values corresponding to the plurality of IR responses. The operations may further comprise generating a disease stage classification for the biofluid test sample by executing a trained neural network on a subset of the discrete set of values.

Another aspect of the present disclosure provides for a method of detecting a disease in a subject. The method may comprise receiving a plurality of biofluid training samples, wherein each biofluid training sample of the plurality of biofluid training samples includes either a disease stage classification or a control sample classification. The method may further comprise generating a continuous infrared (IR) response across a contiguous IR spectrum for each biofluid training sample of the plurality of biofluid training samples. The method may further comprise extracting a plurality of features from each continuous IR response, wherein each feature of the plurality of features corresponds to a contiguous spectral band within the contiguous IR spectrum. The method may further comprise training a first neural network to generate disease stage classifications using the plurality of features extracted from each continuous IR response. The method may further comprise determining a relative importance score for each feature of the plurality of features in generating the disease stage classifications by the first neural network. The method may further comprise selecting a subset of features from the plurality of features with the highest relative importance scores. The method may further comprise calculating, for each respective feature of the subset of features extracted from each continuous IR response, a value corresponding to a discrete IR response that would be produced by an electromechanical IR sensor configured to detect IR light within a discrete IR spectral band corresponding to the respective feature, thereby producing a second plurality of features for each continuous IR response. The method may further comprise training a second neural network to generate the disease stage classifications using the second plurality of features produced for each continuous IR response.

DETAILED DESCRIPTION

Figure 1:
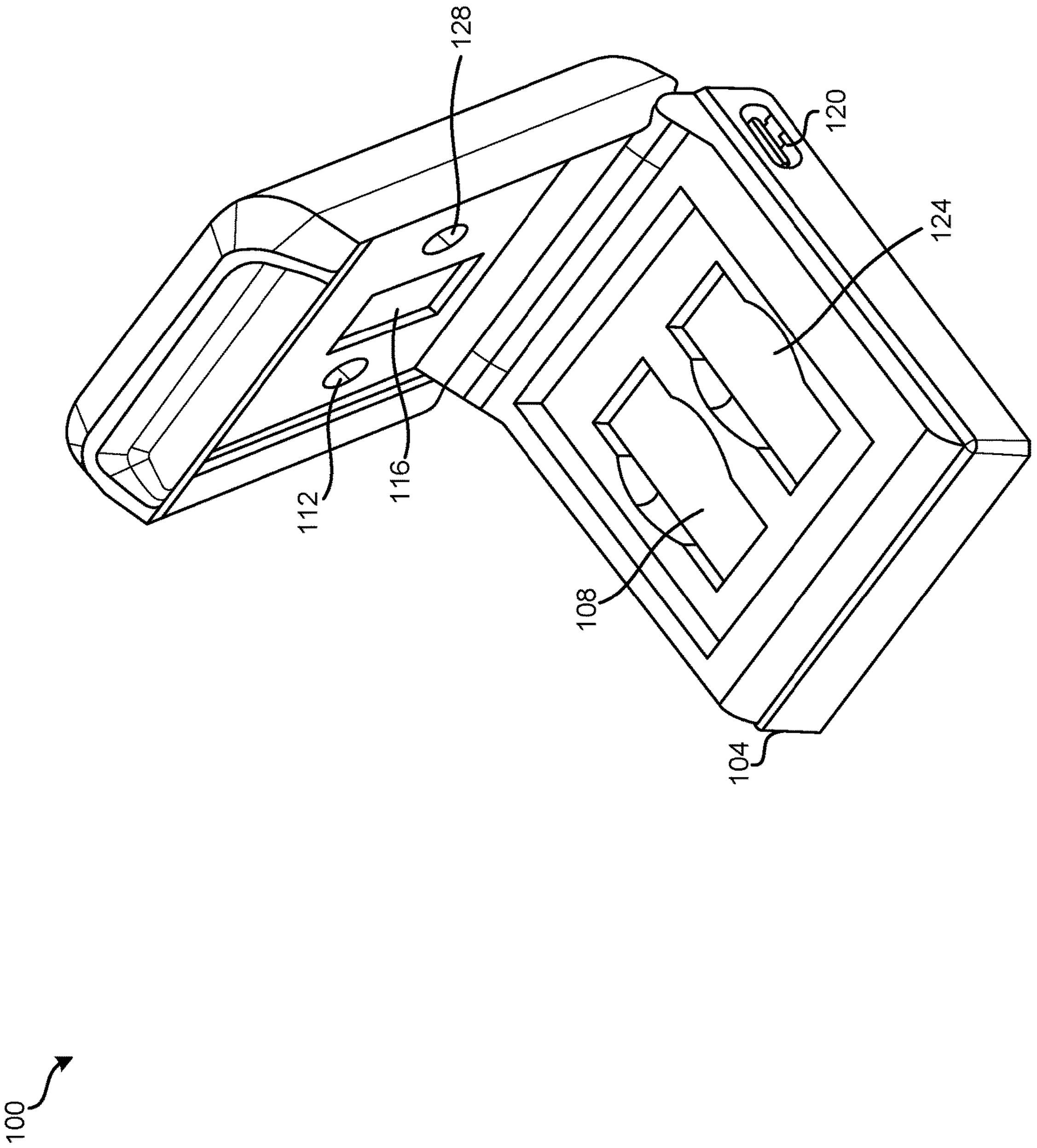
FIG. 1 illustrates a schematic of a portable neural network enabled disease spectroscopy device according to some embodiments.

The detection and study of metabolites in biofluids can carry enormous potential for monitoring of general health, infectious diseases, immune responses, and many pathologies, such as cancer. One rationale for metabolite-based analysis may be that pathophysiological processes lead to biochemical alterations in cell metabolism. For example, with some cancers, hypoxia, excessive inflammatory activity, and reactive oxygen species may contribute to production of sweat-secreted biomarkers. As another example, salivary biomarkers may be produced as a result of some oral cancers. Such biomarkers may range from electrolytes ($Na^+$, $Cl^-$, and $NH_4^-$), immune markers, and metabolites like glucose, lactate, cortisol, ethanol, neuropeptides, and cytokines, to a wide variety of oncometabolites. Depending on the particular disease, a unique fingerprint of molecular by-products may be secreted in various biofluids.

However, despite their potential significance in diagnosing and screening for diseases, existing systems may suffer from a variety of limitations and weaknesses. For example, approaches that provide multiplexed and accurate metabolite detection may include immunohistochemistry, DNA sequencing, and PCR analysis. However, such approaches may require long analytical times, expensive equipment, and invasive tissue biopsy. As another example, approaches including mass spectrometry (MS), nuclear magnetic resonance (NMR), radioimmune or sandwich enzyme-linked immunosorbent assay (ELISA), or Raman spectroscopy, may require off-line, bulky, and expensive apparatuses.

Because structurally unique molecules exhibit distinctive absorptive spectral fingerprints in the infrared (IR) portion of the electromagnetic (EM) spectrum, approaches designed to detect IR spectral fingerprints may have significant potential. For example, using artificial neural networks (NNs), Fourier transform infrared (FTIR) of serum samples from thousands of breast cancer patients can achieve up to 98% sensitivity and 100% specificity. As another example, FTIR of salivary samples can diagnose oral cancers with 100% sensitivity and 89% specificity. These and other diseases may be detected with a small validation dataset. However, many issues may persist in adoption of this promising technique to routine clinical use, including invasive preanalytical sample collection and drying for subsequent measurement, as well as temporal fluctuations of samples with respect to disease progression.

Further still, these and other approaches may be limited to detecting a reduced number of metabolites where a panel of metabolic signatures may be required to produce clinically relevant results. Additionally, many platforms may be limited by inherent weaknesses in electrochemical detection. For example, some approaches are not label-free, instead requiring recognition elements that modify the targeted metabolite's integrity or affinity-based capture approaches that need frequent recharging and/or replacement, both limiting repeated measurements within a short time period and effectively preventing real-time monitoring. As another example, some platforms may rely on high pH (e.g., greater than 10) to function (sweat/saliva are neutral). In yet another example, some platforms may experience limited multiplexing, which may involve stitching together several large sensors further complicating miniaturization efforts for portable or wearable designs.

Embodiments described herein address these and other limitations in the relevant existing technology by providing an innovative, label-free, and portable Neural Network Enabled Disease Spectroscopy (NNEDS) platform based on plasmonic nano-micro electromechanical systems (NMEMS). Compared to other techniques that may rely on continuous IR spectrum data, embodiments described herein can represent improvements in existing technology by, among other things, using advanced machine learning (ML) techniques to identify spectral fingerprints in various biofluid combinations that are statistically significant to the detection of diseases and can be detected using an array of electromechanical IR sensors tailored to detect discrete IR absorption data corresponding to the spectral fingerprints.

Embodiments described herein may provide an NNEDS platform with similar or equivalent performance as compared to mass spectrometry in blood plasma, saliva, and sweat samples collected from healthy human volunteers and diseased patients. Further, embodiments described herein may use or describe approaches (e.g., a number/type of targeted IR spectral fingerprints; use of data from one or various biofluids) to significantly distinguish diseased, such as head and neck early/late cancer, patients vs. healthy patients. Embodiments described herein may determine device performance in terms of specificity, sensitivity, and accuracy. In some embodiments, mass spectrometry (MS) may be used to identify top metabolite candidates driving the changes observed in IR spectral fingerprints determined by the NNs.

Embodiments described herein may provide a compact, portable, affordable, and easy-to-use NNEDS platform to quickly (e.g., in less than 1 second) determine the health status of patients without interfering in their daily life, which would radically improve the ability to diagnose early-stage diseases. Beyond examples of NNEDS in clinical care, embodiments described herein may be well suited for mass-production (e.g., at a manufacturing cost of less than $10 per device) and thus may have tremendous value for large-scale community screening, in both high-risk underserved communities nationally and in the context of global health. Additionally, embodiments described herein can be applied for the diagnosis of a wide range of metabolic conditions, like several types of cancers, diabetes, and heart-diseases, and the like.

FIG. 1 illustrates a schematic of a portable NNEDS device 100 according to some embodiments. Device 100 may be configured to exploit critical IR information in a label-free and portable manner using a multiplexed chip composed of a plurality of plasmonic NMEMS tailored to the IR spectral fingerprints required to perform disease classification. As illustrated, device 100 includes housing 104, sample holder 108, IR light source 112, IR detector 116, and communication port 120. As illustrated, device 100 may further optionally include calibration sample holder 124 and calibration IR light source 128.

In some embodiments, housing 104 is a 3D-printed packaging configured to provide a physical structure within which other components of device 100 are installed. Housing 104 may be fabricated using one or more types of rigid or semi-rigid materials, such as plastic, resin, metal, and the like. Housing 104 may include a top housing portion and a bottom housing portion. The top housing portion may be connected to the bottom housing portion along adjacent edges by a hinge mechanism. The connection between the top housing portion and bottom housing portion may allow housing 104 to transition from an open configuration, as illustrated, to a closed configuration, as further described below.

In some embodiments, components of device 100 may be distributed between the top housing and the bottom housing. For example, the bottom of housing 104 may encapsulate, or otherwise form a structure around, sample holder 108 and calibration sample holder 124. As another example, the top portion of housing 104 may support IR light source 112, IR detector 116, and calibration IR light source 128.

Sample holder 108 and/or calibration sample holder 124 may include openings defined by one or more surfaces of housing 104. Sample holder 108 and/or calibration sample holder 124 may be configured to accept, and securely hold, a biofluid sample for analysis by device 100. For example, sample holder 108 and/or calibration sample holder 124 may be designed to accept a rectangular glass slide or other similar specimen holder designed to contain biofluid samples. As described further herein, sample holder 108 and/or calibration sample holder 124 may further include reflective surfaces located on a bottom surface of sample holder 108 and/or calibration sample holder 124 configured to reflect IR light from IR light source 112 and/or calibration IR light source 128 into IR detector 116.

IR light source 112 and/or calibration IR light source 128 may be miniaturized current-controlled IR broadband sources. IR light source 112 and/or calibration IR light source 128 may each be configured to emit IR light covering wavelengths in the IR band from 2-20 μm. IR light source 112 and/or calibration IR light source 128 may be configured to provide irradiance at various levels of power. For example, IR light source 112 and/or calibration IR light source 128 may provide an irradiance at or below approximately 50 $mW/cm^2$. Irradiance at or below this threshold may allow device 100 to avoid hyperthermia and other adverse effects. In some embodiments, IR light source 112 and/or calibration IR light source 128 operate at approximately 20 $\mu W/cm^2$, or below approximately 1 $mW/cm^2$. Such levels may be selected to be comparable to natural sunlight and/or to be approximately 50 times lower than safety thresholds.

As described further herein, IR detector 116 may include a chip with an array of plasmonic NMEMS sensors. The NMEMS sensors may be electromechanical sensors tailored to detect IR light within discrete spectral bands. As used herein, a discrete spectral band may be defined by a predefined full-width half maximum (FWHM) bandwidth centered at a predefined central wavelength. In some embodiments, the electromechanical sensors within IR detector 116 are configured to detect IR light within noncontiguous spectral bands. For example, the discrete spectral band associated with each electromechanical IR sensor may be selected so as not to overlap with another spectral band associated with another electromechanical IR sensor.

In some embodiments, housing 104 is designed such that light emitted from IR light source 112 irradiates sample holder 108 and is reflected into IR detector 116. For example, and as illustrated, IR light source 112 and IR detector 116 may be located on a same surface of housing 104, and sample holder 108 may be located on an opposite surface of housing 104 while housing 104 is in a closed configuration. Similarly, light emitted from calibration IR light source 128 may be configured to irradiate calibration sample holder 124 and be reflected into IR detector 116. For example, and as illustrated, calibration IR light source 128 may be on a same surface of housing 104 as IR light source 112 and IR detector 116, and IR light source 128 and calibration IR light source 128 may be on opposite sides of IR detector 116.

In some embodiments, the combination of IR light source 112 and sample holder 108 may be functionally interchangeable with the combination of calibration IR light source 128 and calibration sample holder 124. In this way, either combination of light source and sample holder may be used to detect IR absorption by a biofluid sample as well as to perform accurate self-calibration of device 100. Calibration algorithms may be used to account for wave propagation within device 100, the spectrum of IR light source 112 and/or calibration IR light source 128, and/or calibration data taken before each use of device 100. For example, a baseline calibration for IR detector 116 may be obtained by detecting a response to IR light reflected onto calibration sample holder 124 before detecting a response to IR light reflected onto a biofluid sample in sample holder 108. In some embodiments, potential time-dependent power variations of IR light source 112 and/or calibration IR light source 128 are accounted for by including the source current to IR power relationship versus time in a calibration algorithm.

Communication port 120 may configure device 100 to communicate with one or more external computing devices, such as a desktop or laptop computer system, a local server system, or a cloud-based server system. Communication port 120 may include one or more hardware and/or software components. For example, communication port 120 may be a universal serial bus (USB) port, ethernet port, wireless antennas, and the like that allows device 100 to transmit and receive data over one or more wired and/or wireless connections using one or more firmware components installed on a processing system of device 100. Communication port 120 may allow device 100 to receive commands and/or instructions configured to control one or more operations of device 100. For example, communication port 120 may receive one or more wired or wireless signals including instructions that configure device 100 to irradiate a biofluid sample using IR light source 112 and/or calibration IR light source 128 and detect one or more IR spectral fingerprints using IR detector 116. Communication port 120 may allow device 100 to transmit digitalized measurements from IR detector 116 to an external computer system for subsequent processing, such as for disease classification by a trained neural network installed on the external computer system. Additionally, or alternatively, communication port 120 may allow device 100 to transmit a disease stage classification generated by a trained neural network executed by a processing system of device 100 to an external computer system for display and/or subsequent processing.

While not illustrated, device 100 may further include, and housing 104 may further encapsulate, additional or alternative components. For example, device 100 may further include RF circuitry operating at around 220 MHz and composed of coplanar waveguides as well as an oscillator fed by a battery or other power source that can serve as an RF source to IR detector 116, as described further herein. As another example, device 100 may include multiplexer switches to digitally select outputs from IR detector 116. Further still, device 100 may include one or more analog to digital converters to digitalize the selected outputs. In some embodiments, housing 104 may include one or more types of absorbing materials to reduce temporal variations within device 100.

Device 100 may further include one or more components of a computer system, such as one or more processors, a memory, storage, and the like. For example, device 100 may include a field-programmable gate array (FPGA) configured to collect the digitalized data and transmit it to an external computing device, such as a desktop or laptop computer, in which dedicated software can interface with a user and process the collected information to generate a disease classification. As another example, device 100 may include one or more processors configured to execute a trained neural network stored in a memory of device 100 to generate disease stage classifications.

In some embodiments, device 100 may include one or more printed circuit boards (PCBs) including one or more integrated circuit (IC) chips and/or one or more integrated microcontrollers configured to govern one or more functions of the components of device 100, such as IR light source 112, IR detector 116, calibration IR light source 128, and the like. For example, an integrated microcontroller may cause IR light source 112 and/or calibration IR light source 128 to emit IR light, thereby irradiating a biofluid sample in sample holder 108 and/or calibration sample holder 124. Subsequently, the integrated microcontroller may configure IR detector 116 to measure an amount of IR light reflected by the biofluid sample. Based on the amount of IR light measured by IR detector 116, the integrated microcontroller may then process the measurements using a trained neural network to generate a disease classification, as described further herein. Additionally, or alternatively, the integrated microcontroller may output the measurements to an external processing system for subsequent processing by one or more trained neural networks.

Figure 2:
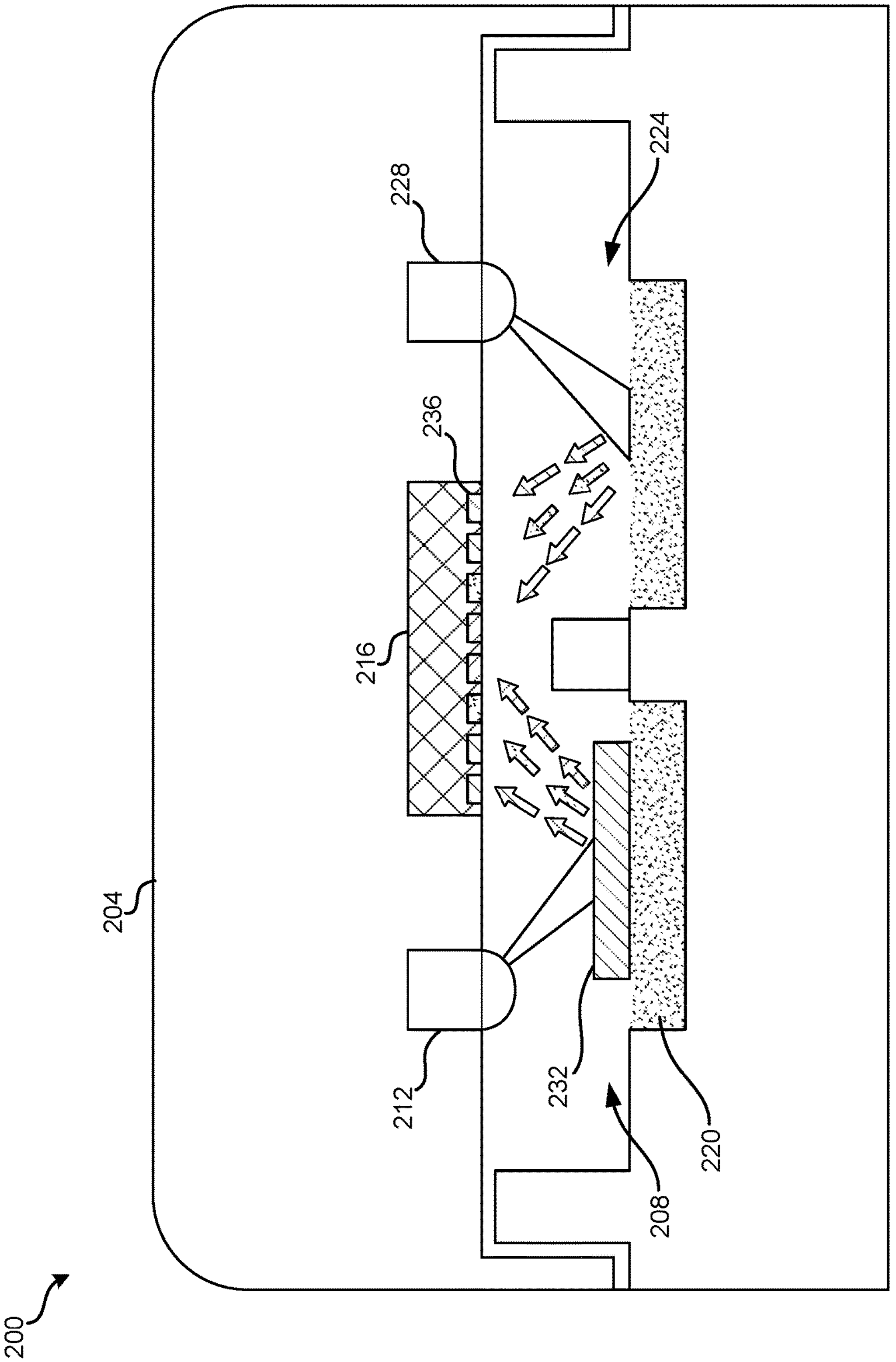
FIG. 2 illustrates a functional diagram of a portable neural network enabled disease spectroscopy device according to some embodiments.

FIG. 2 illustrates a functional diagram of a portable NNEDS device 200 according to some embodiments. Device 200 may be the same, or function in a similar manner, as device 100 described above. As illustrated, device 200 includes housing 204, sample holder 208, IR light source 212, IR detector 216, calibration sample holder 224, and calibration IR light source 228. As further illustrated, housing 204 of device 200 is in a closed configuration compared with housing 104 of device 100. In the closed configuration, IR light source 212, IR detector 216, and calibration IR light source 228 may be in close proximity with sample holder 208 and calibration sample holder 224.

In some embodiments, housing 204 may include one or more light reducing structures and/or surfaces around an exterior of device 200. Light reducing structures and/or surfaces may be configured to reduce an amount of light leaking into or out of device 200 while IR detector 216 is performing measurements of a biofluid sample. By forming a light rejecting barrier, housing 204 may allow device 200 to more accurately measure IR light reflected or absorbed by a biofluid sample. As described above, calibration techniques may be further applied to account for any light leakage into or out of device 200 or the reflection of IR light within device 200.

Sample holder 208 and/or calibration sample holder 224 may function in the same or similar manner as sample holder 108 and/or calibration sample holder 124 described above. For example, sample holder 108 and/or calibration sample holder 124 may be configured to accept biofluid sample 232. As further illustrated, reflective surface 220 may be located on a bottom surface of sample holder 108 and/or calibration sample holder 224. Reflective surface 220 may be configured to reflect light emitted from IR light source 212 and/or calibration IR light source 228 into IR detector 216. With biofluid sample 232 positioned in either sample holder 208, calibration sample holder 224, or both, light from IR light source 212 and/or calibration IR light source 228 may be reflected by reflective surface 220, biofluid sample 232, or both. In other words, reflective surface 220 may help direct IR light from respective IR light sources, through biofluid sample 232, and into IR detector 216.

IR detector 216 may be the same, or function in a similar manner as IR detector 116. For example, IR detector 216 may include an array of electromechanical IR sensors 236 tailored to detect IR light within discrete spectral bands. As further described herein, the output of each electromechanical IR sensor 236 may be converted into a direct current (DC) voltage value representing an amount of IR light absorbed by the respective sensor within a discrete spectral band.

In some embodiments, device 100 and/or device 200 do not determine an actual metabolite concentration nor an absolute absorption level of a biofluid. Instead, trained NNs may rely on relative absorption levels among targeted bands. This may allow for the detection of spectral fingerprints on biofluids independently of the sample volume, enabling non-clinical users to easily collect and analyze samples.

While illustrated and described as a portable device, device 100 may additionally, or alternatively, be implemented as a benchtop device for disease detection. Benchtop devices may be able to accurately recapitulate commercial FTIR quality data in clinical biofluids. Additionally, or alternatively, benchtop setups may provide increased flexibility for testing and/or calibrating IR detector chips, as well as for evaluating the overall performance of the device. Benchtop NNEDS devices may be constructed using similar chips as IR detector 116 and/or IR detector 216 containing dozens of NMEMS sensors tailored to discrete spectral regions. In some embodiments, benchtop devices exhibit a detection performance in terms of specificity, sensitivity, and accuracy within 3% with respect to theoretical predictions. Such detection may be stable versus time, exhibiting fluctuations below 1% during an hour.

Figure 3:
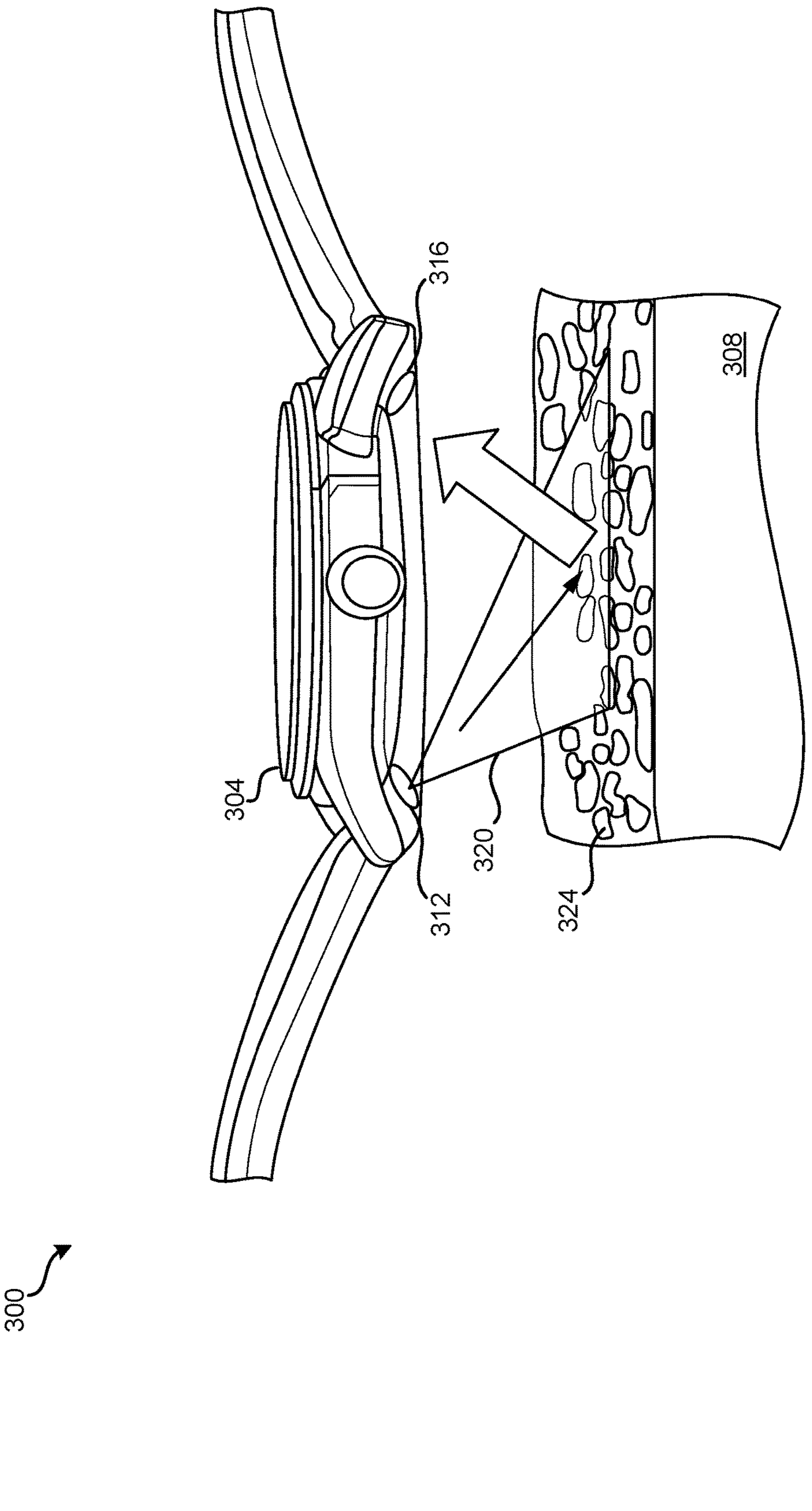
FIG. 3 illustrates an environment in which a wearable neural network enabled disease spectroscopy device may be used according to some embodiments.

FIG. 3 illustrates an environment 300 in which a wearable NNEDS device 304 may be used according to some embodiments. As illustrated, device 304 may be implemented in a wrist-worn device, such as a smart watch or fitness tracker. Additionally, or alternatively, device 304 may be implemented in other types of wearable devices, such as a ring, an arm band, a chest strap, and the like. Device 304 may be configured for continuous, real-time health monitoring using a subset of biofluids. For example, device 304 may periodically detect IR absorption of a user's sweat to generate disease classifications. Device 304 may allow for real-time feedback to patients to report on dangerous conditions related to cancer, diabetes, and heart disease. Additionally, or alternatively, device 304 may act as a predictive tool to advise a user to visit a doctor to complete a more thorough analysis or even to contact emergency services in potentially life-threatening situations. By implementing device 304 in a wearable form factor and using sweat to generate disease classifications and/or predictions, device 304 may exhibit a reduced complexity compared to other devices while also reducing the need to perform more invasive biofluid sample collection.

Device 304 may include IR light source 312 and IR detector 316. Device 304 may function in a similar manner as either device 100 or device 200 described above. For example, device 304 may irradiate sweat 324 on skin 308 with IR light 320 using IR light source 312. IR light source 312 may be the same as IR light source 112 described above. Alternatively, IR light source 312 may be a miniaturized and/or lower power version of IR light source 312 that allows for installation in smaller form factors and requires less power due to the close proximity of device 304 to a wearer's skin 308. IR detector 316 may detect IR light 320 within discrete spectral bands. The amount of IR light 320 detected by IR detector 316 may then be used by device 304 to generate a disease classification.

Figure 4:
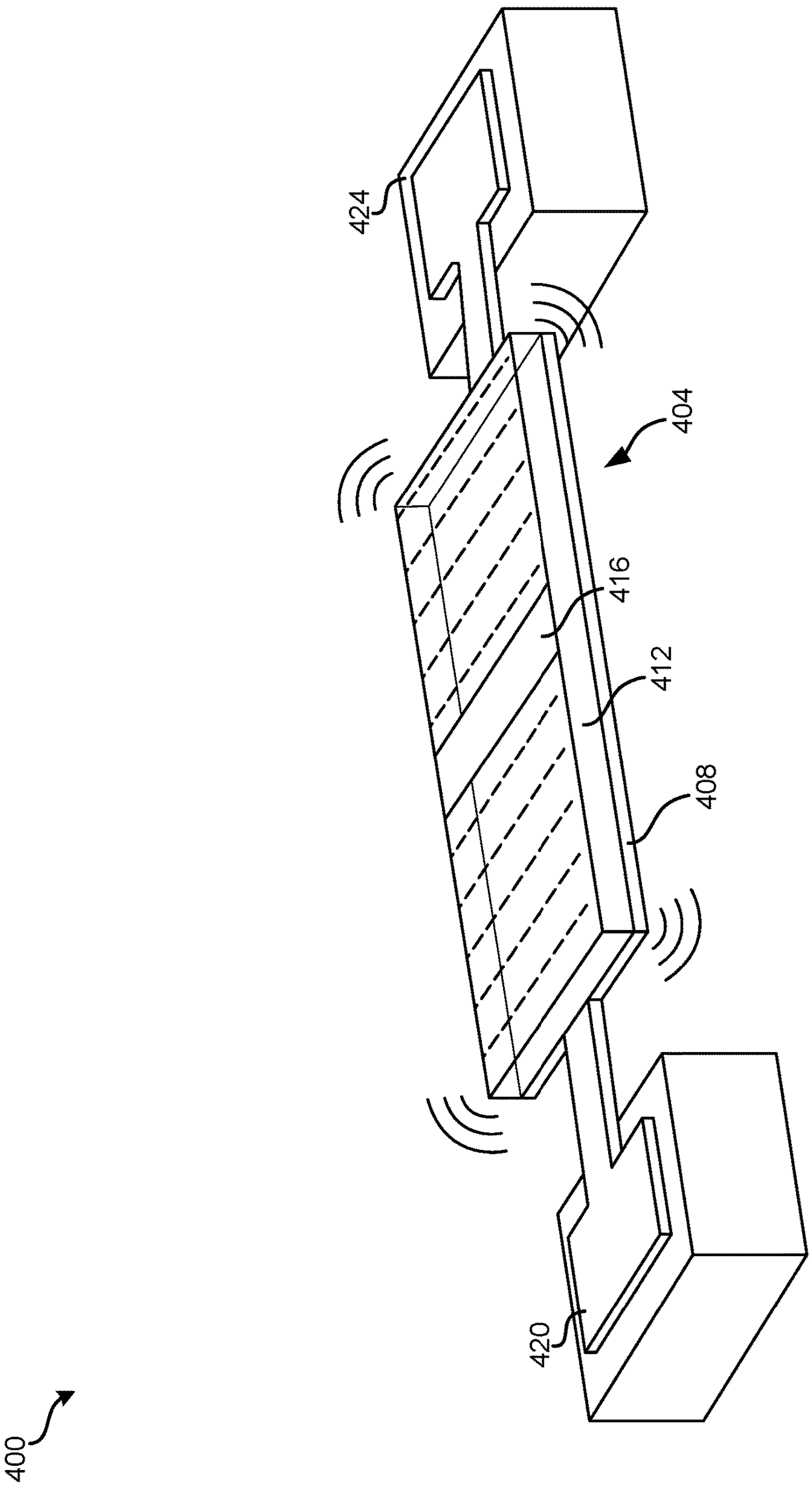
FIG. 4 illustrates a schematic of an electromechanical IR sensor according to some embodiments.

FIG. 4 illustrates a schematic of an electromechanical IR sensor 400 according to some embodiments. As illustrated, sensor 400 includes resonator 404 composed of transduction layer 408, piezoelectric layer 412, and metasurface 416. In some embodiments, resonator 404 is approximately 150 μm long by 50 μm wide by 0.5 μm deep. Transduction layer 408 may be a metal layer patterned to form an interdigitated transducer (IDT). Transduction layer 408 may be used to actuate and sense a high-order lateral-extensional mode of vibration in piezoelectric layer 412 and/or resonator 404 as a whole. In some embodiments, transduction layer 408 is formed from platinum (Pt) with a thickness of approximately 100 nm.

As further illustrated, transduction layer 408 may form tethers 420 physically separating resonator 404 from substrate 424, such as the silicon substrate of an IC chip or wafer on which sensor 404 is fabricated. Tethers 420 may be configured to mechanically support resonator 404 while allowing resonator 404 to vibrate freely. Tethers 420 may additionally, or alternatively provide an electrical connection between resonator 404 and other components of installed on the IC chip.

Piezoelectric layer 412 may be a slab or layer of piezoelectric material, such as aluminum nitrate, aluminum nitride (AlN), or other similar piezoelectric material. In some embodiments, piezoelectric layer 412 may have a thickness of approximately 500 nm. Metasurface 416 may include a nanopatterned plasmonic metasurface. As described herein, a plasmonic metasurface may be a two-dimensional array of metallic nanoantennas with subwavelength thicknesses and spacings. Metasurface 416 may be configured to confine an electric field induced by transduction layer 408 across piezoelectric layer 412 while enabling absorption of IR radiation in piezoelectric layer 412 due to suitably tailored plasmonic resonances of the nanopatterned plasmonic metasurface.

In some embodiments, metasurface 416 includes a gold (Au) nanopatterned plasmonic metasurface that, together with piezoelectric layer 412, forms a transduction mechanism merging tailored optical and electromechanical resonances. Resonator 404 may exhibit a shift in resonant frequency in the MHz band due to the dependence of the AlN mechanical capacitance of piezoelectric layer 412 with absorbed optical power. In some embodiments, metasurface 416 may be patterned to realize electromagnetic (EM) resonances in the IR spectrum, that permits resonator 404 to absorb light at any desired narrow IR band in the 1-20 μm range with a tailored FWHM.

In some embodiments, when an alternating electrical signal is applied to transduction layer 408 of resonator 404, metasurface 416 acts to confine the electric field across the thickness of resonator 404. A high-order contour-extensional vibration mode may be excited through an equivalent piezoelectric coefficient of piezoelectric layer 412 when the frequency of the signal coincides with the natural resonance frequency of resonator 404. Metasurface 416 may selectively absorb IR light impinging on resonator 404 within a narrow IR band, leading to a large and fast increase in the temperature of resonator 404. Such an IR-induced temperature shift may result in a shift in the mechanical resonance frequency of resonator 404 due to an intrinsically large temperature coefficient of frequency (TCF) of resonator 404. Accordingly, the optical power of IR light within the narrow IR band can be readily detected by monitoring the resonance frequency of resonator 404.

Embodiments described herein may operate by producing an IR beam (e.g., using IR light source 108) that is reflected (e.g., by reflective surface 220 and/or biofluid sample 232) into detector 404. The tailored electromagnetic resonance of the Au nanopatterned plasmonic metasurface may enable metasurface 416 to absorb a large portion of the incoming light (e.g., at least 90%) and thereby excite a mechanical contour mode on the free-standing AlN of piezoelectric layer 412, shifting the mechanical resonance of detector 400. Metasurface 416 may be patterned to selectively absorb at a specific IR region matched to a desired spectral band reflecting areas of interest for diagnostic discrimination of cancer, or other diseased patients' biofluids.

Embodiments described herein may further operate by exciting detector 400 with an RF signal tuned to its resonant frequency, such as approximately 220 MHz. The reflected signal acquires a phase directly proportional to the absorbed IR power. A phase-differential interrogation approach may then employed to (i) obtain a constant and enhanced responsivity versus the incoming optical power; and (ii) remove unwanted noise components (electrical, mechanical, optical, and thermal) and ensure high-performance. To this purpose, a reference detector may be employed to cancel noise components in a differential fashion. The phase difference between RF signals may be proportional to the IR absorption at the targeted band and can be translated into a DC voltage for a rapid readout.

Sensor 400 can be characterized in terms of (i) mechanical quality factor ($Q_m$); (ii) IR absorption profile (e.g., using FTIR); and (iii) resolution and noise equivalent power (NEP) versus the RF signal frequency and the IR response. For each metric, the mean, standard deviation, repeatability, and potential time-deviations may be estimated, and potential variations among sensors 400 fabricated on different wafers may be explored to assess reproducibility. Comparisons across resonators 404 tuned at different IR wavelengths within a same chip can be made for calibration purposes. The IR power may be increased in a controlled manner and the output DC voltage of each channel can be monitored. A weight-average gradient-descent algorithm can be applied to correlate n voltages with the absorption of n different IR bands, using an error function defined as the difference between the absorption spectrum recorded in all channels with the power radiated by the source in that band. Determination of the detection limit can be accomplished via least-squares fitting of the detector response (e.g., across multiple resonators). The calibration algorithm, enhanced with data collected by control and redundant units as well as with data from calibration reflectors, can be based on the Beer-Lambert's law and analytical models to characterize light propagation and unwanted reflections.

In some embodiments, sensor 400 designed as described above may exhibit $Q_m \approx 2000$, responsivity≈2.0°/μW and a noise equivalent power of NEP≈0.15 $nWHz^{-1/2}$. They may further exhibit tailored absorption at the specific IR spectral regions identified by feature importance analysis, as described further herein. Each sensor 400 may provide a voltage output proportional to the absorption of the targeted band within 2% accuracy. In some embodiments, sensor 400 maintains temporal fluctuations below 2%. In some embodiments an FPGA can (i) receive and store the output voltage from each sensor 400; and (ii) transmit all data to a PC for further processing.

In some embodiments, sensor 400 allows for label-free IR characterization of biofluids to be performed in a non-destructive fashion. As described above, an IR spectrum may represent a "spectral biomarker" for disease, i.e., optical signals serving as a measurable indicator of health at the molecular level. Multiplexed detection within a complex spectrum may enable detection of the underlying metabolites absorbing in the IR region. Accordingly, using a plasmonic IR detector that exploits IR-spectroscopy and RF-interferometry may allow for accurate and selective detection of IR spectral fingerprints, and quick (e.g. in microseconds) translation of the IR spectral fingerprints into electrical signals. Arrays of multiplexed sensors on a single chip approximately the size of a square millimeter may simultaneously test multiple spectral fingerprints. Each sensor may be tuned to only respond to a relevant IR band specific to the spectral features of interest. The array of sensors may output a set of electrical signals that depend on the specific absorbance of targeted IR bands. Signals may then be collected, digitalized, and processed using trained NNs. NNEDS devices, such as device 100 and/or device 200 described above, can enable near instantaneous (e.g., within 1 second) predictive diagnostics based on relative absorption levels found in targeted IR bands in healthy vs. diseased patient samples. Since miniaturized sensors can each detect specific spectral regions, an array of sensors can be tailor-made to efficiently carry out NN processing on-chip. The sensor array can represent "nodes" of interest arising from data modeling.

As described above, an array of n sensors 400 tuned to n specific IR bands can be fabricated on an IR detector chip. The number of sensors, as well as their central wavelength and FWHM, may be determined based on the results of a feature importance analysis of a NN NN trained to classify diseases using continuous IR samples, as further described herein. As used herein, a continuous IR sample may represent a continuous IR measurement across all or a contiguous band of the IR spectrum. Fabrication of IR detector chips comprising an array of sensors 400 may lead to a set of several identical chips, with an approximate area of 8×8 $mm^2$, each composed of many (up to several hundreds) sensors 400 with identical mechanical quality factor $Q_m \approx 2000$ but different IR absorption profiles obtained by modifying the dimension of unit cells on metasurface 416, as further described below. Additional sensors 400 for redundancy and reference can be included. Components in coplanar technology, namely mixers, filters, power dividers, and couplers can be included in a chip design to implement the RF-interferometry described above. The chip can be designed using a finite element method solver software and a circuit simulator software. After validation, all numerical models can be put together and several rounds can be carried out to optimize the circuit geometry aiming to remove unwanted cross-couplings and higher-order effects.

A dedicated set-up, can be applied to characterize the performance of a chip. A system-design platform can be employed to control (i) the RF signal frequency; and (ii) the IR waves generated using a blackbody radiator. Multiplexer switches can digitally select one of the chip outputs (e.g., a sensor from an array of sensors). The voltage may be digitalized using a data acquisition system and then fed into an FPGA for data storage and transmission to a PC for processing. Automatized measurements can be performed to explore each sensor's output, considering both the lack of samples as well as control samples with well-known IR absorption profile.

Figure 5:
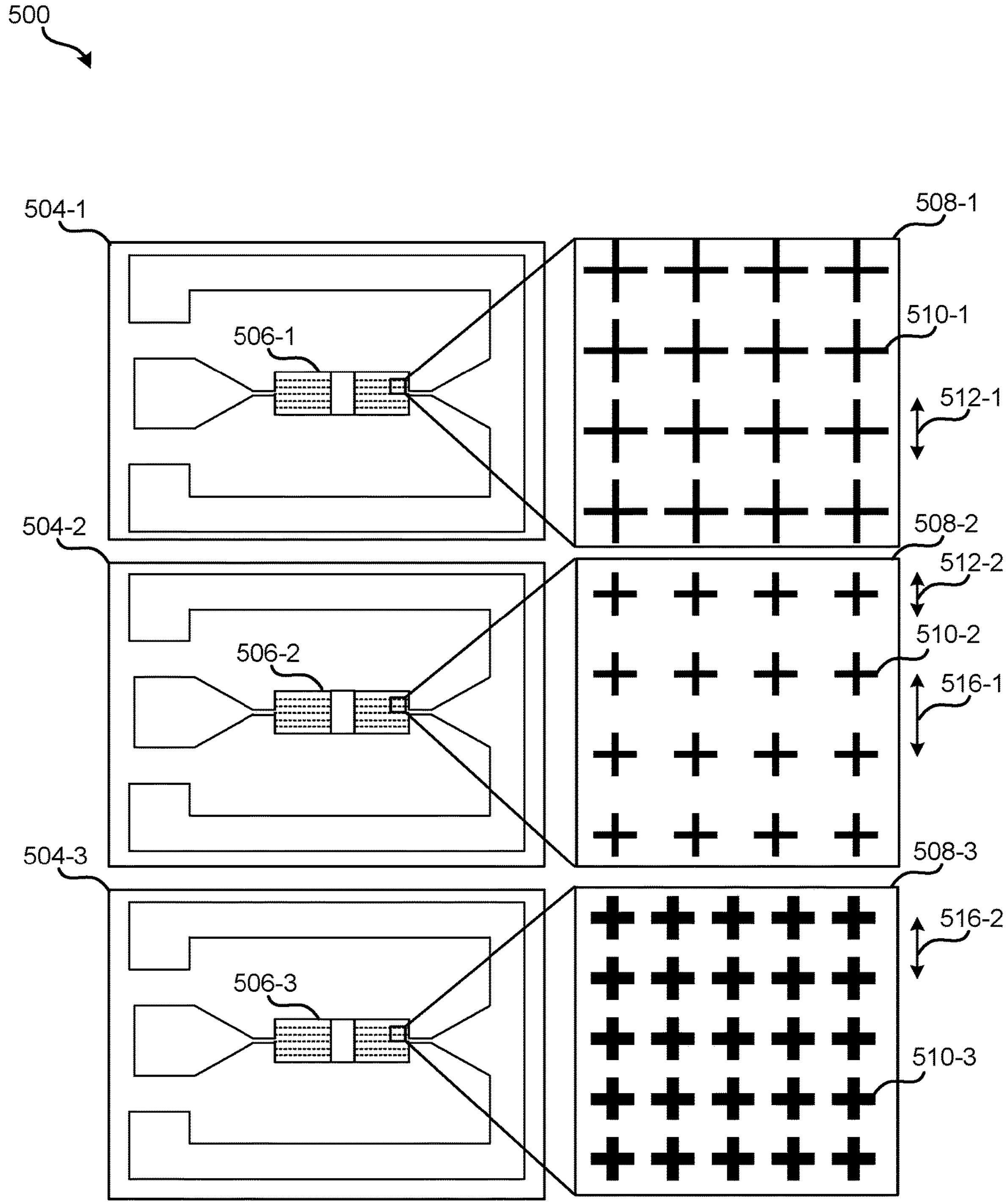
FIG. 5 illustrates an array of electromechanical IR sensors according to some embodiments.

FIG. 5 illustrates an array 500 of electromechanical IR sensors 504 according to some embodiments. As described above, array 500 may be fabricated on a single IC chip. While array 500 is illustrated as comprising three sensors 504 (e.g., first sensor 504-1, second sensor 504-2, and third sensor 504-3), embodiments described herein may include arrays comprising tens, hundreds, or more sensors 504 tuned to a corresponding number of specific IR bands. As further illustrated, each sensor 504 may include a resonator 506. Resonators 506 may be the same, or function in a similar manner as resonators 404 described above. For example, resonators 506 may be comprised of multiple layers of materials, including an IDT layer, an AlN nanoplate, and an Au nanopatterned plasmonic metasurface 508.

FIG. 5. further illustrates a magnified view of each metasurface 508. Different types of ultrathin (e.g., 100 nm thick) Au metasurfaces 508 may be patterned on resonators 506 to control the absorption central wavelength (e.g., within the 1-20 μm range) as well as a FWHM down to 0.15 μm. As illustrated, metasurfaces 508 are patterned with cross-shaped unit-cells 510. Each patterned metasurface 508 may include unit-cells 510 with different dimensions 512 of the corresponding unit-cells 510 (e.g., the length and/or thickness of the arms of the cross-shape) as well as different periodicities 516 (e.g., distances from other unit-cells 510) compared to other metasurfaces 508. For example, and as illustrated, dimensions 512-1 of unit-cells 510-1 on metasurface 508-1 may be larger than dimensions 512-2 of unit-cells 510-2 on metasurface 508-2. As another example, periodicity 516-1 between unit-cells 510-2 on metasurface 508-2 may be greater than periodicity 516-2 between unit-cells 510-3 on metasurface 508-3. Depending on dimensions 512 and/or periodicities 516 on metasurfaces 508, each resonator 506 may be tuned to absorb IR light within a predefined spectral band (e.g., FWHM) centered at a predefined wavelength.

Cross-shaped unit-cells 510 may be insensitive to the polarization of IR radiation and maintain a constant angular response up to ±45° with respect to the normal direction of sensors 504, which adds extra flexibility to locate IR sources (e.g., IR light source 112 and/or calibration IR light source 128) and sample holders (e.g., sample holder 108 and/or calibration sample holder 124) within NNEDS devices, such as device 100 and/or device 200. In some embodiments, a linear variation exists between the phase of an RF signal reflected by a sensor and the optical power absorbed by the sensor. Metrics associated with sensors 504 may include a responsivity of 3.8°/μW and a noise equivalent power (NEP) $\approx 1.5 \cdot 10^{-10}$ $WHz^{-1/2}$. In some embodiments, sensors 504 can resolve the concentration of IR gold nanorods with an error less than approximately 0.25%. Sensors 504 can exhibit an unprecedented average mechanical quality factor of $Q_m \approx 3900$.

Alternative approaches to construct metasurfaces 508 composed of different design patterns may be used, such as ultra-sharp Fano resonances. Algorithms to consider potential time-dependent fluctuations may be expanded, which might arise due to power variations from RF sources and/or IR sources. The separation distance of sensors 504 within a chip may be increased to account for cross-coupling EM noise between adjacent resonators 508. In some embodiments, responsivities three orders of magnitude lower than 3.8°/mW instead of 3.8°/μW can enable NNs, as described below, to achieve accuracies over 85%.

Embodiments described herein provide for neural network enabled IR sensor and/or detector designs. Continuous IR spectra may be processed with advanced ML classifiers to identify a set of discrete IR spectral fingerprints. The discrete IR spectral fingerprints may permit the determination of the status of a sample without diminishing detection performance (e.g., as compared with detection using continuous IR spectra). Moving from the continuous IR spectrum, which may require bulky and expensive FTIR equipment, into a discrete number of IR spectral fingerprints may provide for accurate detection using NMEMS IR sensing technology, as described above.

For a desired disease classification specificity, accuracy, and sensitivity, ML techniques may be used to determine the number and features (e.g., central wavelength and FWHM) of spectral fingerprints. This information may be employed to guide the IR sensor design, as described further herein. Additionally, new sets of NNs may be developed and trained considering the actual IR response of fabricated sensors to predict the overall performance of an NNEDS platform prior to fabrication.

In some embodiments, NNEDS devices are able to produce disease classifications with a specificity of at least 94%, sensitivity of at least 93%, and accuracy of at least 94% using as few as 50 tailored NMEMS sensors. NNEDS devices using as few as 20 NMEMS sensors may maintain an accuracy of at least 90% while NNEDS devices using as few as 10 NMEMS sensors may maintain an accuracy of at least 80%. Furthermore, NNEDS device performance may be improved by increasing the number of samples used to train respective NNS, applying multi-source NNs, including more NMEMS sensors, and/or adding flexibility to their IR responses (e.g., using sensors with sharper or wider FWHM).

Figure 6:
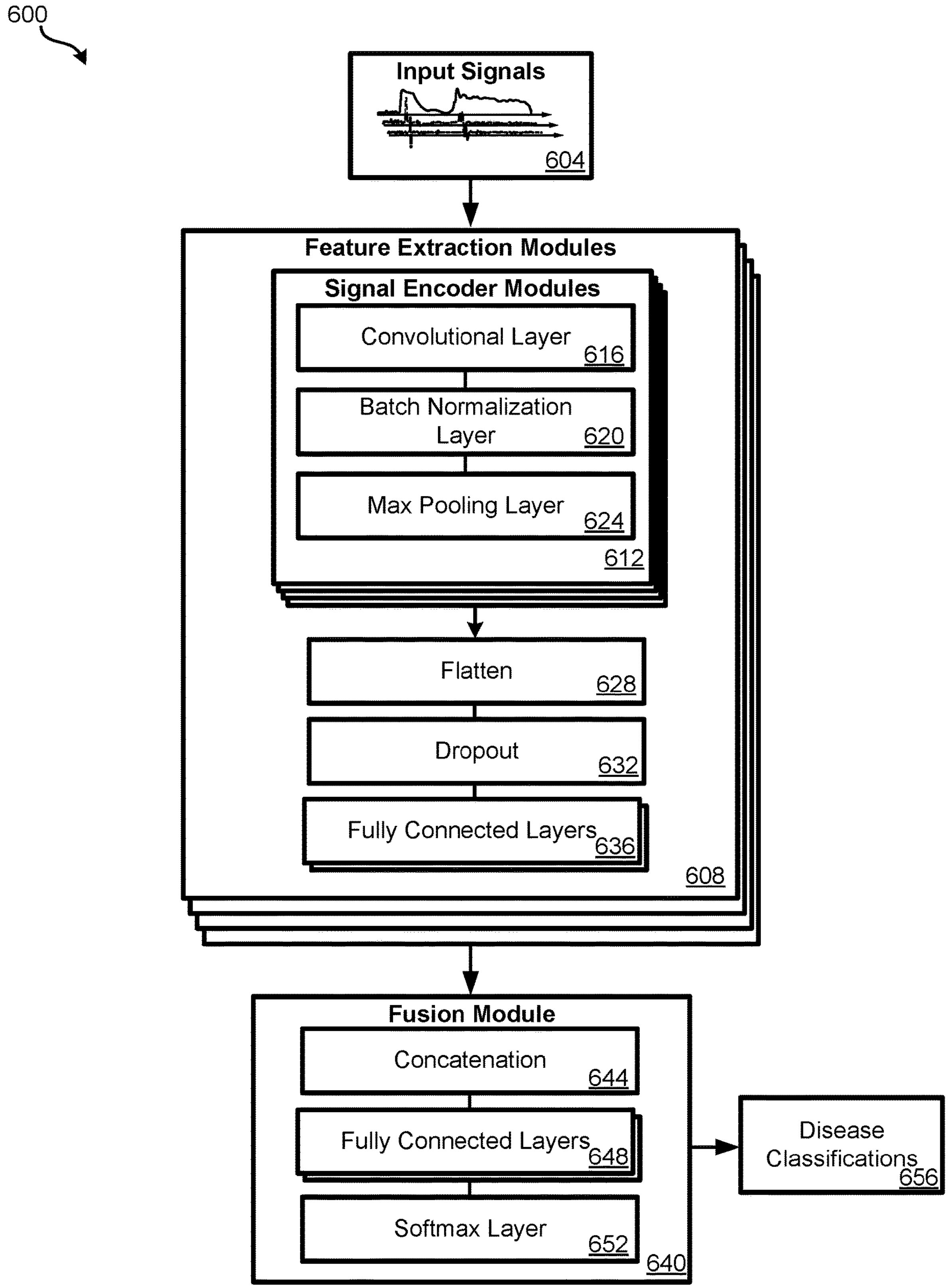
FIG. 6 illustrates a disease spectroscopy neural network architecture according to some embodiments.

FIG. 6 illustrates a disease spectroscopy neural network architecture 600 according to some embodiments. Architecture 600 may be a convolutional neural network (CNN) architecture configured for spectral identification and/or disease classifications 656 from input signals 604. Input signals 604 may include continuous IR spectra measured using FTIR, gas-chromatography mass spectrometry (GC-MS), and the like. Additionally, or alternatively, input signals 604 may include discrete IR spectral fingerprints measured using an array of sensors tuned to discrete IR bands, as described above. In some embodiments, input signals 604 may include raw spectral data as well as the first and second derivatives of the raw spectral data. Input signals 604 may be collected from one or more types of biofluids, such as sweat, saliva, plasma, urine, and the like. Input signals 604 may optionally be labeled with a disease classification.

In some embodiments, a library of input signals 604 from multiple biofluids (e.g., sweat, saliva, plasma, urine, tears, breast milk, cerebrospinal fluids, ascites, pleural effusions, and the like) may be built and/or maintained. A large database of IR spectral features may be built from biofluids collected from hundreds of cancer, or other diseased patients as well as healthy patients. Biofluid samples can be processed using mass spectrometry (MS), histopathology, and/ or imaging techniques. A library of labeled IR spectra may be used to train one or more components of architecture 600. Subsequently, an input signal corresponding to an as yet unclassified biofluid sample, or a combination of input signals corresponding to multiple biofluid samples collected from a same patient, may be classified using architecture 600.

Feature extraction (FE) modules 608 may be configured to extract all available information from input signals 604 and produce features necessary to generate a disease classification. In some embodiments, architecture 600 includes a separate FE module 608 for each type of input signal 604 (e.g., for each biofluid type). As illustrated, FE modules 608 include: signal encoder (SE) modules 612 responsible for extracting spatial features from input signals 604; flattening layer 616 responsible for flattening the output of SE modules 612; dropout layer 632 to reduce overfitting; and fully connected layers 636. As further illustrated, SE modules 612 include convolutional layer 616, followed by batch normalization layer 620 (e.g., to reduce training time), and max pooling layer 624 to reduce the size of the input data. Depending on input signals 604, SE modules 612 may be used multiple times to improve flexibility and adaptability during classification.

Fusion module 640 may allow architecture 600 to merge knowledge extracted by FE modules 608. For example, fusion module 640 may allow architecture 600 to identify cross-hidden knowledge present in different biofluids and vibrational techniques. As illustrated, fusion module 640 includes concatenation layer 644 to fuse features extracted by FE modules 608, thereby increasing the knowledge with cross-information from different biofluidics and vibrational techniques. Fusion module 640 further includes fully connected layers 648 and softmax layer 652 for the identification of different disease stages (e.g., early vs. late or stage I, II, II, IV, etc.). In some embodiments, architecture 600 uses a self-regularized non-monotonic activation function to prevent overfitting.

In some embodiments, architecture 600 is continuously expanded and trained as more data (e.g., input signals 604) are available. Dedicated NNs (e.g., FE modules 608) can be constructed for each biofluid (plasma, sweat, saliva), independently considering dried and solution phase measurements. In some embodiments, architecture 600 includes recurrent NNs to extract deep relative relations from absorption at different wavelengths and can leverage on Few-Shot Learning (FSL) to train NNs with small datasets. Additionally, multi-source NNs (e.g., fusion module 640) can be trained to extract inter-sample information and boost the detection performance. Each NN can account for a combination of biofluids, i.e., saliva-sweat, saliva-plasma, etc. Multi-source NNs can consist of hidden representation modules to extract knowledge for the individual classification of each biofluid as well as fusion modules to extract superior knowledge by cross-referencing the data from various biofluids.

In some embodiments, performance of architecture 600 will increase as the data size increases and also with the use of FSL. Other types of NNs (convolutional, attention mechanism, transformers, graph neural networks, etc.) may be used to enhance performance in addition to the application of the Savitzky-Golay algorithm, and/or including additional features to classify samples, such as age, gender, race, and BMI. A water component suppression NN module may be developed and trained to determine the amount of water present in the samples to compensate for its effect in the absorption spectra of samples.

NN performance can be characterized in terms of specificity, sensitivity, and accuracy. In some embodiments, NNs designed according to architecture 600 can be trained and tested to (i) classify the health status of a patient using IR spectra from one or various samples; and (ii) determine a disease stage (early/late). In some embodiments, NNs designed according to architecture 600 demonstrate specificity, sensitivity, and accuracy greater than 96% to classify the status of an isolated biofluid sample; and greater than 97% to classify the health status of a patient using IR data from various types of biofluids. Combining IR data from non-invasive biofluids (saliva, sweat) can enhance the overall detection performance of the network.

In some embodiments, ML algorithms are applied to determine the IR bands that maximize the classification process, including one per each combination of biofluid and type of measurement (dried/solution phase) and additional ones for possible biofluid combinations. As described above, the central wavelengths and FWHM of the IR bands can be obtained using recursive feature elimination with cross-validation (RFECV) and one or more gradient boosting algorithms. Non-uniform IR bands may account for broad/sharper characteristics in the IR spectra. RFECV can be employed to recursively eliminate the least important IR band in the classification while maintaining a desired performance. Even though accuracy may increase with the number of IR bands employed, saturation may be reached with a moderate number of bands. For example, saturation may occur with approximately 35 bands.

Additional sets of NNs can be developed to classify IR responses within discrete spectral bands identified as described above. Measured data from actual sensors, such as sensors 400, can be employed to sample the IR spectrum and provide a DC voltage output per discrete spectral band. NNs deep enough to obtain relative relationships among the output voltages can be employed to predict the performance of an array of sensors, such as array 500 described above. To improve training, the dataset can be balanced using various oversampling techniques.

For single and/or multi-source NNs, ML algorithms can determine the number of sensors required to achieve a desired performance (specificity, sensitivity, accuracy) and can provide their responses in terms of central wavelength and FWHM. Additionally, the capability of the NNs to determine the cancer stage (early/late) can be monitored. In some embodiments, the NNs adapted for discrete IR bands may perform within 2% as NNs trained on continuous IR spectra.

After identifying the discrete IR bands that provide a desired classification performance, arrays of sensors (e.g., array 500) may be designed to detect IR responses within the discrete IR bands, as described above. For example, after identifying a discrete IR band, a corresponding sensor (e.g., sensor 504-1) may be fabricated with a metasurface (e.g., metasurface 508-1) tuned to absorb IR light within the discrete IR band.

Subsequently, the NNs developed to classify IR responses within discrete spectral bands may be revised and retrained to account for (i) the actual response of the sensors, as discussed above; and (ii) propagation effects, including source-detector distance, IR beam broadening, and multiple wave reflections. The data collected to train and test the NNs may additionally be increased, focusing on compensating for these phenomena.

In some embodiments, detection performance criteria may be improved by: (i) applying FSL to train predictive NNs with small datasets; (ii) designing sensors with smaller FWHM (down to 0.1 μm) using designs based on Fano resonances; (iii) increasing the number of sensors multiplexed on a chip; (iv) applying the Savitzky-Golay algorithm; (v) using other type of NNs as described above; and (vi) applying different feature section techniques, such as simulated annealing, decision trees, or genetic algorithms. The NNs may be trained again until a desired performance is obtained. The water component suppression NN described above may be adapted to operate using a discrete set of IR bands.

Embodiments described herein elucidate the metabolites driving the observed changes in IR absorption of cancer biofluids. Metabolomics performed on collected biofluids can be employed to identify which metabolites are changing between cancers or other diseases, and healthy samples. Chemical Similarity Enrichment Analysis (ChemRICH) software may be used to generate set enrichment statistics between the two groups. This may yield study-specific, non-overlapping sets of all identified metabolites. Statistical groupings of molecules (e.g., chemical class headers) can be tied back to specific wavelengths in the absorption spectra. The chemicals identified by ChemRICH that demonstrate significant difference (either up or down regulated) can be characterized between comparison groups of cancer, or other disease, vs. control to identify cancer pathways reflected in the absorption data. Pure absorption spectra may be obtained from metabolites to fit raw absorption data using linear regression to analytically demonstrate goodness of fit.

Figure 7:
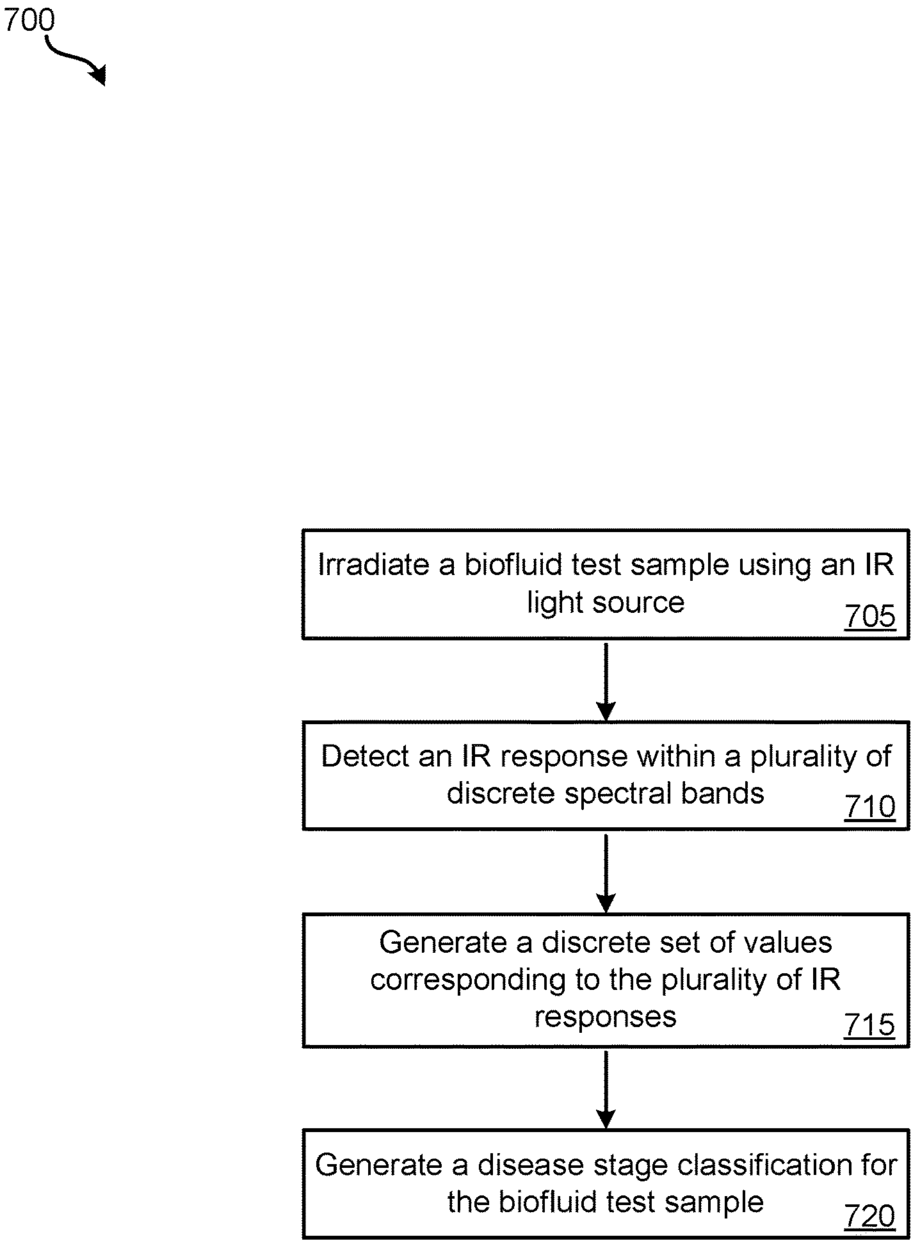
FIG. 7 illustrates an exemplary method of detecting diseases according to some embodiments.

FIG. 7 illustrates an exemplary method 700 of detecting diseases according to some embodiments. Method 700 can be implemented in software (e.g., code, instructions, program) executed by one or more processing units (e.g., processors, cores) of the respective systems, hardware, or combinations thereof. The software may be stored on a non-transitory storage medium (e.g., on a memory device). Method 700 may be performed in whole, or in part, on an NNEDS device or platform, as described above. For example, some or all steps of method 700 may be performed on an NNEDS device, such as device 100 described above, while other steps of method 700 may be performed on a separate computer system. Although FIG. 7 depicts various processing steps occurring in a particular sequence or order, this is not intended to be limiting. In certain alternative embodiments, the steps may be performed in some different order or some steps may also be performed in parallel.

Method 700 may begin at step 705 by irradiating a biofluid test sample using an IR light source. As described above, the biofluid test sample may include a saliva sample, a sweat sample, a blood sample, a plasma sample, a urine sample, and the like. The biofluid test sample may be collected from a patient and stored on a glass slide or other specimen holder. The biofluid test sample may be irradiated using a current-controlled IR broadband source configured to emit IR light that covers the IR spectrum from 2-16 μm.

At step 710, an IR response may be detected within each discrete spectral band of a plurality of discrete spectral bands. As a result, a plurality of IR responses for the biofluid test sample may be provided. As described above, a discrete spectral band may be defined by a band of wavelengths with a predefined width (e.g., a predefined bandwidth) around predefined central wavelength. In some embodiments, each discrete spectral band of the plurality of discrete spectral bands is separate from other discrete spectral bands of the plurality of discrete spectral bands within a larger spectrum. For example, within a broader spectrum, the predefined bandwidth of a discrete spectral band may not overlap with other bandwidths of other discrete spectral bands. As another example, each predefined central wavelength within the plurality of discrete spectral bands may be unique. Additionally, or alternatively, the bandwidths may be different from one discrete spectral band to the next. As described further herein, the plurality of discrete spectral bands may be selected based on the training and analysis of a neural network configured to generate disease stage classifications using continuous IR responses.

Each IR response of the plurality of IR responses may be detected using a single chip. The chip may include an array (e.g., array 500) of a plurality of electromechanical IR sensors, such as sensor 400 and/or sensors 504 described above. Each electromechanical IR sensor may be configured to detect IR light within a respective discrete spectral band of the plurality of discrete spectral bands. For example, there may be a one-to-one relationship between each discrete spectral band of the plurality of discrete spectral bands and each electromechanical IR sensor of the plurality of electromechanical IR sensors.

Each electromechanical IR sensor may include a piezoelectric resonator having a nanopatterned metasurface (e.g., resonators 506). As described herein, a piezoelectric resonator may be a nano or micro electromechanical device configured to produce mechanical vibrations in response to an applied electric field (e.g., from an RF source tuned to its resonant frequency). The piezoelectric resonator may include a slab or layer of piezoelectric material, such as AlN, deposited onto an IDT, as described above. A nanopatterned metasurface may be a thin film deposited on the surface of the piezoelectric resonator composed of subwavelength nanostructures that can be tuned to absorb IR energy within discrete spectral bands. For example, the nanopatterned metasurface may include a plurality of cross-shaped unit-cells with dimensions (e.g., arm length and periodicities) tuned to a discrete spectral band. In some embodiments, the dimensions of the unit-cells for each electromechanical IR sensor are different to achieve the one-to-one relationship between each discrete spectral band of the plurality of discrete spectral bands and each electromechanical IR sensor of the plurality of electromechanical IR sensors.

In the presence of IR light within a discrete spectral band, a nanopatterned metasurface tuned to the discrete spectral band may cause a change in temperature, and thereby mechanical resonance frequency, of the piezoelectric resonator. With a greater amount of light absorbed by the nanopatterned metasurface (e.g., absorbed optical power), the change in mechanical resonance frequency may be greater. The change in mechanical resonance frequency may be observed through RF interferometery techniques. For example, a phase difference between the RF signal used to excite the resonator and a reflected signal may be determined. The phase difference may then be translated into a numerical value (e.g., a DC voltage) indicative of the IR absorption within the discrete spectral band of the biofluid test sample.

At step 715, a discrete set of values corresponding to the plurality of IR responses may be generated. As described above, the phase difference of a piezoelectric resonator may be translated into a discrete numerical value (e.g., a DC voltage) representing a relative amount of IR absorption by a biofluid test sample within a discrete spectral band. Extending such a translation to each electromechanical IR sensor may provide a discrete set of values corresponding to the plurality of IR responses detected by the plurality of electromechanical IR sensors.

At step 720, a disease stage classification may be generated for the biofluid test sample. The disease stage classification may be generated by executing a trained neural network on the discrete set of values generated at step 715. The trained neural network may be configured to generate a disease stage classification for a particular disease (e.g., a particular type of cancer). For example, based on the discrete set of values, the trained neural network may generate a classification indicating whether the patient from whom the biofluid test sample was obtained has the particular disease, and if so, in what stage of progression is the disease (e.g., stage I, II, III, etc.). Additionally, or alternatively, the trained neural network may be configured to generate a disease stage classification from multiple diseases. For example, the trained neural network may be configured to identify the presence of cancer as opposed to other diseases and further identify a particular type of cancer.

In some embodiments, the trained neural network is selected from a plurality of neural networks. The trained neural network may be selected based on the type of the biofluid test samples (e.g., sweat, saliva, plasma, etc.). For example, a neural network trained on data collected form saliva samples may be selected when the biofluid test sample is saliva. Additionally, or alternatively, the trained neural network may be selected based on the type of disease being interrogated in the biofluid test sample. For example, a neural network trained on a set of samples collected from control patients or patients exhibiting a particular disease may be selected to determine whether the current biofluid test sample is indicative of a patient having the same particular disease.

Additionally, or alternatively, the trained neural network may be executed on a subset of the discrete set of values. The subset of the discrete set of values may be selected based on the neural network. For example, while training the neural network to detect the presence of a particular disease, it may be determined that different subsets of the discrete values are determinative in generating disease stage classification for different diseases. In this way, while the discrete set of values may not be useful in generating a disease stage classification for every disease, the device, or chip, may be used for a wider variety of diseases. Additionally, or alternatively, the subset of the discrete set of values may be selected based on the type of the biofluid test sample. For example, during development, subsets of the discrete values generated for a first biofluid type may lead to an erroneous disease classification while the same values generated for a second biofluid type may increase the accuracy of the disease classification. Accordingly, for the first biofluid type, the subset of discrete values may be removed, or omitted from use by the neural network and included for other biofluid types.

The disease stage classification generated by the trained neural network may be a single value or indication, such as a Boolean value indicating the presence or absence of a particular disease, or a disease identification. Additionally, or alternatively, the disease stage classification may include an identification of multiple diseases, stages, etc. along with an associated probability or confidence value indicating the likelihood that the disease is present in the biofluid test sample.

In some embodiments, one or more steps of method 700 are optionally repeated one or more times to improve the disease stage classification. For example, after generating an initial disease stage classification at step 720, method 700 may return to step 705 to irradiate a different biofluid test sample. The different biofluid test sample may be collected from a same patient. For example, multiple biofluid samples, such as a saliva sample, a blood sample, a plasma sample, and the like, may be collected from a same patient. For each subsequent biofluid sample, method 700 may produce a new disease stage classification. Each subsequent disease stage classification can be combined to form an aggregate disease stage classification using one or more algorithms. Additionally, or alternatively, a trained neural network may be configured to generate an enhanced disease stage classification by fusing the features extracted from each biofluid test sample. Such a multi-source neural network may be executed for each iteration of method 700, thereby iteratively improving upon each preceding disease stage classification. Additionally, or alternatively, a multi-source neural network may be executed once after generating a discrete set of values for each corresponding biofluid test sample.

Figure 8:
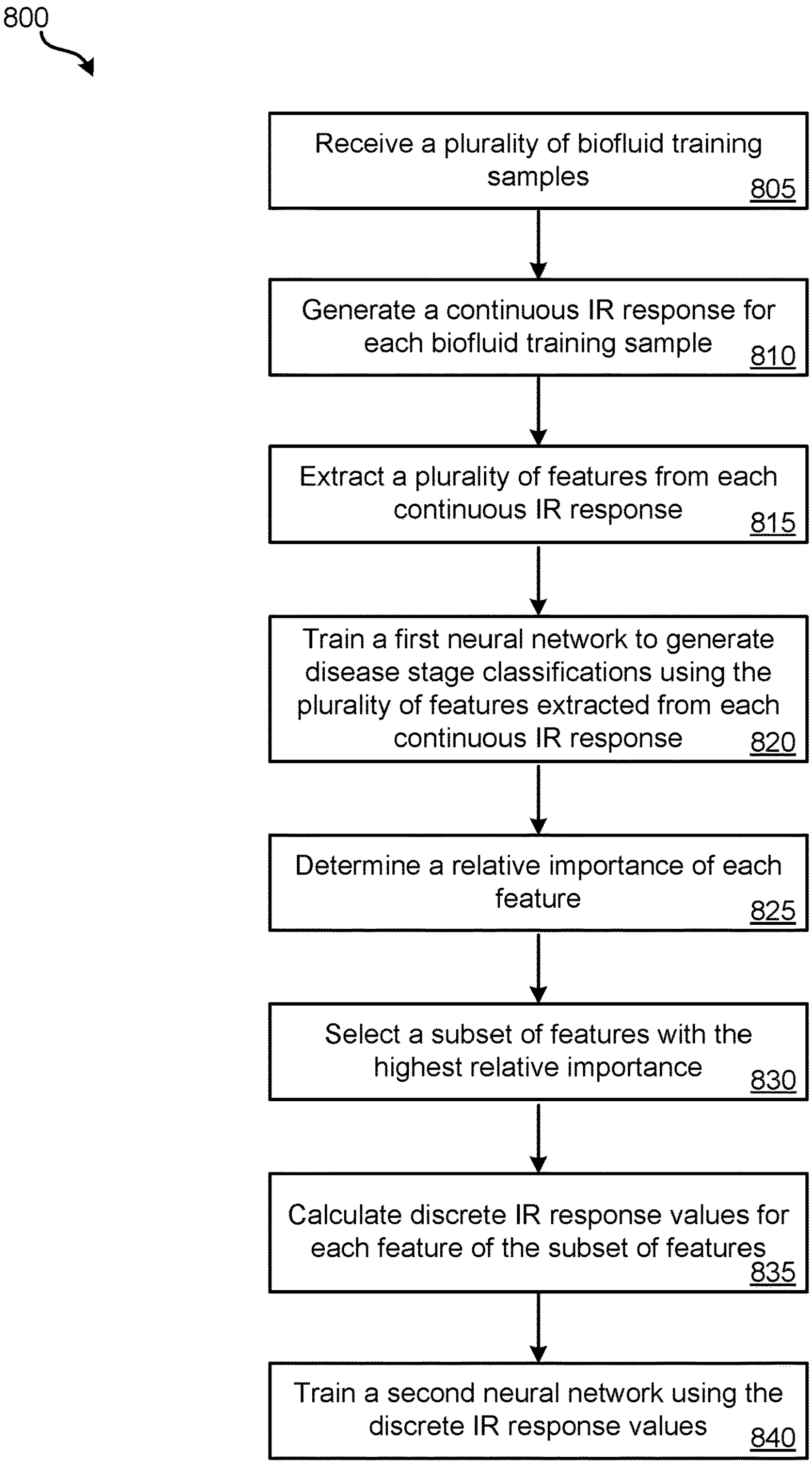
FIG. 8 illustrates another exemplary method of detecting diseases according to some embodiments.

FIG. 8 illustrates an exemplary method 800 of detecting diseases according to some embodiments. Method 800 can be implemented in software (e.g., code, instructions, program) executed by one or more processing units (e.g., processors, cores) of the respective systems, hardware, or combinations thereof. The software may be stored on a non-transitory storage medium (e.g., on a memory device). Although FIG. 8 depicts various processing steps occurring in a particular sequence or order, this is not intended to be limiting. In certain alternative embodiments, the steps may be performed in some different order or some steps may also be performed in parallel.

Method 800 may begin at step 805 by receiving a plurality of biofluid training samples. The plurality of biofluid training samples may all be a same type of biofluid or a mixture of biofluid types. Each biofluid training sample may include a label. Labels may include one or more pieces of information about a patient from which a biofluid training sample is collected. For example, labels may indicate whether a patient has been diagnosed with a disease, a particular type of disease that the patient has been diagnosed with, a disease progression stage of the disease, and the like.

At step 810, a continuous IR response for each biofluid training sample may be generated. Compared to IR responses within discrete spectral bands, as described above, continuous IR responses may represent a continuous measure of the IR absorption of a biofluid across a contiguous spectrum, such as the IR spectrum from 2 μm to 20 μm. The continuous IR responses may be generated using FTIR, gas chromatography mass spectrometry (GC-MS), and the like.

At step 815, a plurality of features may be extracted from each continuous IR response. Each feature of the plurality of features may correspond to a contiguous spectral band within the contiguous IR spectrum represented by a continuous IR response. For example, the contiguous IR spectrum may be broken into contiguous spectral bands spaced 0.1 μm apart with a FWHM of 0.15 μm. For each spectral band within the contiguous IR spectrum, a corresponding feature may be extracted each continuous IR response, thereby providing a plurality of features for each continuous IR response. Additionally, or alternatively, the plurality of features may automatically be extracted from each continuous IR response using one or more neural networks (e.g., FE modules 608).

At step 820, a first neural network may be trained to generate disease stage classifications using the plurality of features extracted from each continuous IR response. As described above, the first neural network may be trained to generate a disease stage classification for a particular disease or multiple diseases, using pluralities of features corresponding to one or more biofluid types. The first neural network may be trained according to one or more supervised, semi-supervised, or unsupervised training techniques.

For example, the first neural network may be trained using the labels associated with each biofluid training sample from which the plurality of features were extracted.

At step 825, a relative importance of each feature in generating disease stage classifications by the first neural network may be determined. Various techniques may be used to determine the relative importance of each feature, such as a weighting analysis, an activation analysis, and/or gradient-based methods. At step 830, a subset of features with the highest relative importance may be selected. In some embodiments, the subset of features are selected by ranking relative importance scores associated with each of the plurality of features and selecting the highest ranked features. Additionally, or alternatively, one or more feature selection techniques may be used to identify an optimal subset of features. For example, one technique may recursively remove less important features from the model and assess the resulting performance of the neural network until a minimum number of features are identified that allow the neural network to generate disease stage classifications meeting predefined threshold criteria for sensitivity, accuracy, and specificity. As further described above, identifying the subset of features for each disease may constitute an identification of a unique spectral fingerprint exhibited in diseased biofluid samples.

At step 835, discrete IR response values may be calculated for each feature of the subset of features. The discrete IR response values may be calculated for each feature of the subset of features from each continuous IR response of the plurality of continuous IR responses. The discrete IR response values may correspond to the value that would be produced by an electromechanical IR sensor configured to detect IR light within the discrete IR spectral band corresponding to the respective feature (e.g., sensor 400). The discrete IR response values calculated for each continuous IR response may constitute a second plurality of features for each continuous IR response that would have been extracted from the plurality of biofluid training samples.

At step 840, a second neural network may be trained to generate disease stage classifications using the discrete IR response values. The second neural network may be trained in a similar manner as the first neural network. Subsequently, the second neural network may be used to generate disease stage classifications in biofluid test samples using a device with an array of sensors tuned to detect IR absorption within the discrete spectral bands corresponding to the subset of features (e.g., device 100), as described above in reference to method 700.

Figure 9:
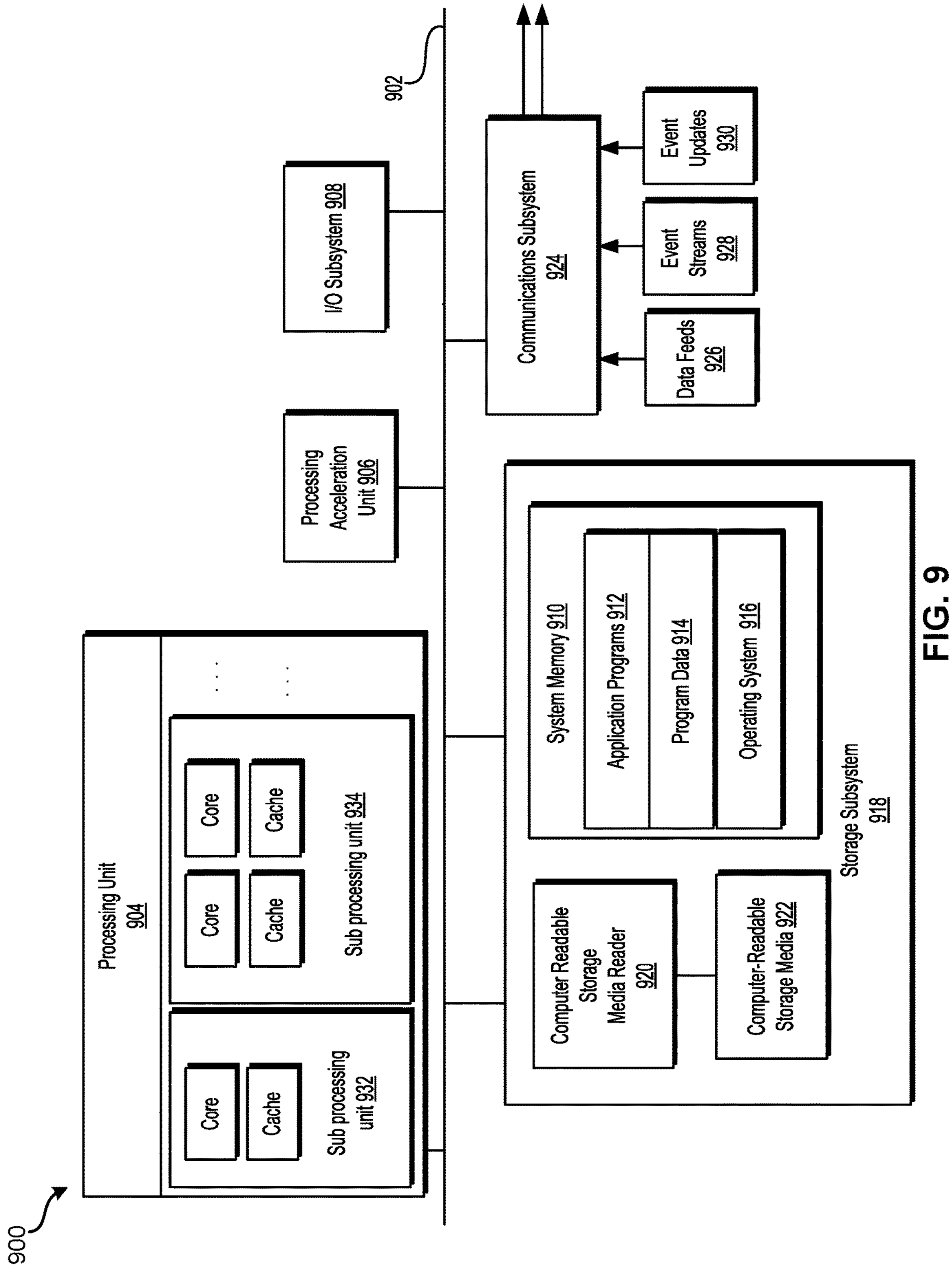
FIG. 9 illustrates an example computer system in which various embodiments may be implemented.

FIG. 9 illustrates an example computer system 900, in which various embodiments may be implemented. Computer system 900 may be used to implement any of the computer systems and/or electronic device processing systems described above. As shown in the figure, computer system 900 includes a processing unit 904 that communicates with a number of peripheral subsystems via a bus subsystem 902. These peripheral subsystems may include a processing acceleration unit 906, an I/O subsystem 908, a storage subsystem 918 and a communications subsystem 924. Storage subsystem 918 includes tangible computer-readable storage media 922 and a system memory 910.

Bus subsystem 902 provides a mechanism for letting the various components and subsystems of computer system 900 communicate with each other as intended. Although bus subsystem 902 is shown schematically as a single bus, alternative embodiments of the bus subsystem may utilize multiple buses. Bus subsystem 902 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 904, which can be implemented as one or more integrated circuits (e.g., a conventional microprocessor or microcontroller), controls the operation of computer system 900. One or more processors may be included in processing unit 904. These processors may include single core or multicore processors. In certain embodiments, processing unit 904 may be implemented as one or more independent processing units 932 and/or 934 with single or multicore processors included in each processing unit. In other embodiments, processing unit 904 may also be implemented as a quad-core processing unit formed by integrating two dual-core processors into a single chip.

In various embodiments, processing unit 904 can execute a variety of programs in response to program code and can maintain multiple concurrently executing programs or processes. At any given time, some or all of the program code to be executed can be resident in processor(s) 904 and/or in storage subsystem 918. Through suitable programming, processor(s) 904 can provide various functionalities described above. Computer system 900 may additionally include a processing acceleration unit 906, which can include a digital signal processor (DSP), a special-purpose processor, and/or the like.

I/O subsystem 908 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 900 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 900 may comprise a storage subsystem 918 that comprises software elements, shown as being currently located within a system memory 910. System memory 910 may store program instructions that are loadable and executable on processing unit 904, as well as data generated during the execution of these programs.

Depending on the configuration and type of computer system 900, system memory 910 may be volatile (such as random-access memory (RAM)) and/or non-volatile (such as read-only memory (ROM), flash memory, etc.) The RAM typically contains data and/or program modules that are immediately accessible to and/or presently being operated and executed by processing unit 904. In some implementations, system memory 910 may include multiple different types of memory, such as static random-access memory (SRAM) or dynamic random-access memory (DRAM). In some implementations, a basic input/output system (BIOS), containing the basic routines that help to transfer information between elements within computer system 900, such as during start-up, may typically be stored in the ROM. By way of example, and not limitation, system memory 910 also illustrates application programs 912, which may include client applications, Web browsers, mid-tier applications, relational database management systems (RDBMS), etc., program data 914, and an operating system 916. By way of example, operating system 916 may include various versions of Microsoft Windows®, Apple Macintosh®, and/or Linux operating systems, a variety of commercially available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 918 may also provide a tangible computer-readable storage medium for storing the basic programming and data constructs that provide the functionality of some embodiments. Software (programs, code modules, instructions) that when executed by a processor provide the functionality described above may be stored in storage subsystem 918. These software modules or instructions may be executed by processing unit 904. Storage subsystem 918 may also provide a repository for storing data used in accordance with the present disclosure.

Storage subsystem 900 may also include a computer-readable storage media reader 920 that can further be connected to computer-readable storage media 922. Together and optionally, in combination with system memory 910, computer-readable storage media 922 may comprehensively represent remote, local, fixed, and/or removable storage devices plus storage media for temporarily and/or more permanently containing, storing, transmitting, and retrieving computer-readable information.

Computer-readable storage media 922 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information, and which can be accessed by computing system 900.

By way of example, computer-readable storage media 922 may include a hard disk drive that reads from or writes to non-removable, nonvolatile magnetic media, a magnetic disk drive that reads from or writes to a removable, nonvolatile magnetic disk, and an optical disk drive that reads from or writes to a removable, nonvolatile optical disk such as a CD ROM, DVD, and Blu-Ray® disk, or other optical media. Computer-readable storage media 922 may include, but is not limited to, Zip® drives, flash memory cards, universal serial bus (USB) flash drives, secure digital (SD) cards, DVD disks, digital video tape, and the like. Computer-readable storage media 922 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magneto-resistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 900.

Communications subsystem 924 provides an interface to other computer systems and networks. Communications subsystem 924 serves as an interface for receiving data from and transmitting data to other systems from computer system 900. For example, communications subsystem 924 may enable computer system 900 to connect to one or more devices via the Internet. In some embodiments communications subsystem 924 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 924 can provide wired network connectivity (e.g., Ethernet) in addition to or instead of a wireless interface.

In some embodiments, communications subsystem 924 may also receive input communication in the form of structured and/or unstructured data feeds 926, event streams 928, event updates 930, and the like on behalf of one or more users who may use computer system 900.

By way of example, communications subsystem 924 may be configured to receive data feeds 926 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 924 may also be configured to receive data in the form of continuous data streams, which may include event streams 928 of real-time events and/or event updates 930, that may be continuous or unbounded in nature with no explicit end. Examples of applications that generate continuous data may include, for example, sensor data applications, financial tickers, network performance measuring tools (e.g., network monitoring and traffic management applications), clickstream analysis tools, automobile traffic monitoring, and the like.

Communications subsystem 924 may also be configured to output the structured and/or unstructured data feeds 926, event streams 928, event updates 930, and the like to one or more databases that may be in communication with one or more streaming data source computers coupled to computer system 900.

Computer system 900 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 900 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments have been described, various modifications, alterations, alternative constructions, and equivalents are also encompassed within the scope of the disclosure. Embodiments are not restricted to operation within certain specific data processing environments but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A device for detecting diseases, the device comprising:
- an infrared (IR) light source;
- a chip comprising a plurality of electromechanical IR sensors, wherein each electromechanical IR sensor of the electromechanical IR sensors comprises a piezoelectric resonator having a nanopatterned metasurface configured to absorb IR light within a discrete spectral band centered at a predefined wavelength and having a predefined bandwidth;
- at least one processor; and
- a memory storing one or more instructions, which when executed by the at least one processor, configure the device to:
  - irradiate a biofluid test sample using the IR light source;
  - detect, using the chip, an IR response within the discrete spectral band of each electromechanical IR sensor, thereby providing a plurality of IR responses for the biofluid test sample within a plurality of discrete spectral bands defined by the plurality of electromechanical IR sensors;
  - generate a discrete set of values corresponding to the plurality of IR responses; and
  - generate a disease stage classification for the biofluid test sample by executing a trained neural network on a subset of the discrete set of values,
  - wherein the biofluid test sample is a first biofluid type of a plurality of biofluid types comprising blood, plasma, sweat, saliva, tears, cerebrospinal fluid, ascites, and pleural effusion, and wherein the one or more instructions further configure the device to:
  - select the trained neural network from a plurality of trained neural networks based on a combination of the first biofluid type and at least one additional biofluid type of the plurality of biofluid types;
  - irradiate, for the at least one additional biofluid type, a respective biofluid test sample from a same subject as the biofluid test sample using the IR light source;
  - detect, using the chip, a second IR response within the discrete spectral band of each electromechanical IR sensor, thereby providing a second plurality of IR responses within the plurality of discrete spectral bands for the respective biofluid test sample;
  - generate a second discrete set of values corresponding to the second plurality of IR responses; and
  - update the disease stage classification by executing the trained neural network on a second subset of the second discrete set of values.

2. The device of claim 1, further comprising a biofluid sample holder disposed adjacent to the IR light source and the chip, wherein the biofluid sample holder is configured to reflect light from the IR light source through the biofluid test sample onto the plurality of electromechanical IR sensors.

3. The device of claim 1, wherein the nanopatterned metasurface of each electromechanical IR sensor comprises a plurality of cross-shaped unit-cells, wherein a separation between each cross-shaped unit-cell is defined by a periodicity dimension, and wherein arms of each cross-shaped unit-cell are defined by a length dimension.

4. The device of claim 3, wherein the periodicity dimension, the length dimension, or both, configure the nanopatterned metasurface to absorb IR light within the discrete spectral band, and wherein the periodicity dimension, the length dimension, or both, are different between each electromechanical IR sensor.

5. The device of claim 1, wherein the discrete set of values represent relative absorption levels of IR light from the IR light source by the biofluid test sample across the plurality of discrete spectral bands.

6. The device of claim 1, wherein the one or more instructions further configure the device to select the trained neural network from the plurality of trained neural network based on a disease type.

7. The device of claim 1, wherein the discrete spectral band of each electromechanical IR sensor is selected by ranking a plurality of contiguous spectral bands according to a relative importance of a plurality of features corresponding to each contiguous spectral band in generating disease stage classifications by a neural network trained on the plurality of features.

8. A method of detecting diseases, the method comprising:
- irradiating a biofluid test sample using an IR light source;
- detecting, using a chip, an IR response within each discrete spectral band of a plurality of discrete spectral bands, thereby providing a plurality of IR responses for the biofluid test sample within the plurality of discrete spectral bands, wherein:
  - the chip comprises a plurality of electromechanical IR sensors; and
  - each electromechanical IR sensor of the electromechanical IR sensors comprises a piezoelectric resonator having a nanopatterned metasurface configured to absorb IR light within a discrete spectral band of the plurality of discrete spectral bands centered at a predefined wavelength and having a predefined bandwidth;
- generating a discrete set of values corresponding to the plurality of IR responses; and
- generating a disease stage classification for the biofluid test sample by executing a trained neural network on a subset of the discrete set of values,
- wherein the biofluid test sample is a first biofluid type of a plurality of biofluid types comprising blood, plasma, sweat, saliva, tears, cerebrospinal fluid, ascites, and pleural effusion, and wherein the method further comprises:
- selecting the trained neural network from a plurality of trained neural networks based on a combination of the first biofluid type and at least one additional biofluid type of the plurality of biofluid types;
- irradiating, for the at least one additional biofluid type, a respective biofluid test sample from a same subject as the biofluid test sample using the IR light source;
- detecting, using the chip, a second IR response within the discrete spectral band of each electromechanical IR sensor, thereby providing a second plurality of IR responses within the plurality of discrete spectral bands for the respective biofluid test sample;
- generating a second discrete set of values corresponding to the second plurality of IR responses; and updating the disease stage classification by executing the trained neural network on a second subset of the second discrete set of values.

9. The method of claim 8, further comprising reflecting light from the IR light source through the biofluid test sample onto the plurality of electromechanical IR sensors using a biofluid sample holder disposed adjacent to the IR light source and the chip.

10. The method of claim 8, wherein the nanopatterned metasurface of each electromechanical IR sensor comprises a plurality of cross-shaped unit-cells, wherein a separation between each cross-shaped unit-cell is defined by a periodicity dimension, and wherein arms of each cross-shaped unit-cell are defined by a length dimension.

11. The method of claim 10, wherein the periodicity dimension, the length dimension, or both, configure the nanopatterned metasurface to absorb IR light within the discrete spectral band, and wherein the periodicity dimension, the length dimension, or both, are different between each electromechanical IR sensor.

12. The method of claim 8, wherein the discrete set of values represent relative absorption levels of IR light from the IR light source by the biofluid test sample across the plurality of discrete spectral bands.

13. The method of claim 8, further comprising selecting the discrete spectral band of each electromechanical IR sensor by ranking a plurality of contiguous spectral bands according to a relative importance of a plurality of features corresponding to each contiguous spectral band in generating disease stage classifications by a neural network trained on the plurality of features.

14. One or more non-transitory computer-readable storage media storing instructions that, upon execution on a computer system, cause the computer system to perform operations comprising:

irradiating a biofluid test sample using an IR light source;

detecting, using a chip, an IR response within each discrete spectral band of a plurality of discrete spectral bands, thereby providing a plurality of IR responses for the biofluid test sample within the plurality of discrete spectral bands, wherein:

the chip comprises a plurality of electromechanical IR sensors; and each electromechanical IR sensor of the electromechanical IR sensors comprises a piezoelectric resonator having a nanopatterned metasurface configured to absorb IR light within a discrete spectral band of the plurality of discrete spectral bands centered at a predefined wavelength and having a predefined bandwidth;

generating a discrete set of values corresponding to the plurality of IR responses; and generating a disease stage classification for the biofluid test sample by executing a trained neural network on a subset of the discrete set of values, wherein the biofluid test sample is a first biofluid type of a plurality of biofluid types comprising blood, plasma, sweat, saliva, tears, cerebrospinal fluid, ascites, and pleural effusion, and wherein the operations further comprise:

selecting the trained neural network from a plurality of trained neural networks based on a combination of the first biofluid type and at least one additional biofluid type of the plurality of biofluid types;

irradiating, for the at least one additional biofluid type, a respective biofluid test sample from a same subject as the biofluid test sample using the IR light source;

detecting, using the chip, a second IR response within the discrete spectral band of each electromechanical IR sensor, thereby providing a second plurality of IR responses within the plurality of discrete spectral bands for the respective biofluid test sample;

generating a second discrete set of values corresponding to the second plurality of IR responses; and updating the disease stage classification by executing the trained neural network on a second subset of the second discrete set of values.

* * * * *